(12) United States Patent
Gray et al.

(10) Patent No.: US 6,480,895 B1
(45) Date of Patent: *Nov. 12, 2002

(54) INTEGRATION OF OBJECTS INCLUDING JAVA BYTECODES WITH LEGACY 3270 APPLICATIONS

(75) Inventors: James Peyton Gray, Chapel Hill, NC (US); David Louis Kaminsky, Chapel Hill, NC (US); James Merwin Mathewson, II, Chapel Hill, NC (US); Marcia Lambert Peters, Raleigh, NC (US); Richard Dean Telford, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/073,423

(22) Filed: May 6, 1998

(51) Int. Cl.⁷ .............................................. G06F 15/16
(52) U.S. Cl. ....................... 709/231; 709/230; 709/236; 709/202
(58) Field of Search ................................ 709/202, 203, 709/227, 328, 231, 230, 236; 370/401

(56) References Cited

U.S. PATENT DOCUMENTS

| | | | | |
|---|---|---|---|---|
| 5,325,361 A | * | 6/1994 | Lederer et al. | 370/401 |
| 5,347,632 A | * | 9/1994 | Filepp et al. | 709/202 |
| 5,649,101 A | * | 7/1997 | Mathewson, II | 709/245 |
| 5,754,830 A | * | 5/1998 | Butts et al. | 709/311 |
| 5,909,569 A | * | 6/1999 | Housel, III et al. | 703/21 |
| 5,958,013 A | * | 9/1999 | King et al. | 709/227 |
| 5,964,836 A | * | 10/1999 | Rowe et al. | 709/221 |
| 6,014,702 A | * | 1/2000 | King et al. | 709/227 |
| 6,061,714 A | * | 5/2000 | Housel, III et al. | 709/203 |
| 6,067,579 A | * | 5/2000 | Hardman et al. | 709/328 |
| 6,122,638 A | * | 9/2000 | Huber et al. | 707/103 |
| 6,192,411 B1 | * | 2/2001 | Chan et al. | 709/232 |
| 6,216,101 B1 | * | 4/2001 | Butts et al. | 703/27 |

OTHER PUBLICATIONS

IBM, "*3270 Information Display System Data Stream Programmer's Reference*", GA23–0059–07, 1992.

* cited by examiner

Primary Examiner—Robert B. Harrell
Assistant Examiner—Paul H Kang
(74) Attorney, Agent, or Firm—Myers Bigel Sibley & Sajovec; Jeanine S. Ray-Yarletts

(57) ABSTRACT

Objects including Java bytecodes are embedded in a 3270 datastream structured field. The 3270 datastream structured field, including the objects so embedded, are passed between a primary logical unit and a secondary logical unit that communicate with each other over a network using 3270 datastream architecture. An initialization protocol sends a Read Partition (Query) structured field from the primary logical unit to the secondary logical unit, to query whether the secondary logical unit supports Java. The secondary logical unit sends a Query Reply structured field to the primary logical unit in response to receipt of the Read Partition (Query) from the primary logical unit if the secondary logical unit supports Java. In response to receipt of the Query Reply structured field from the secondary logical unit, the 3270 datastream structured field including embedded objects such as Java bytecodes is passed between the primary logical unit and the secondary logical unit. The objects that are embedded in a 3270 datastream structured field may include Java bytecodes, images and audio. Spanning may be used to send objects that exceed structured field length limits. Accordingly, Java and other objects may be integrated with legacy 3270 applications, without requiring the rewriting of legacy applications, and allowing the use of the highly developed 3270 datastream architecture.

72 Claims, 13 Drawing Sheets

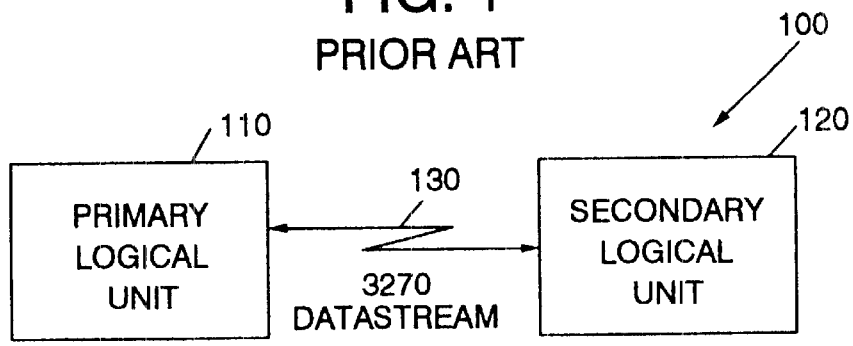
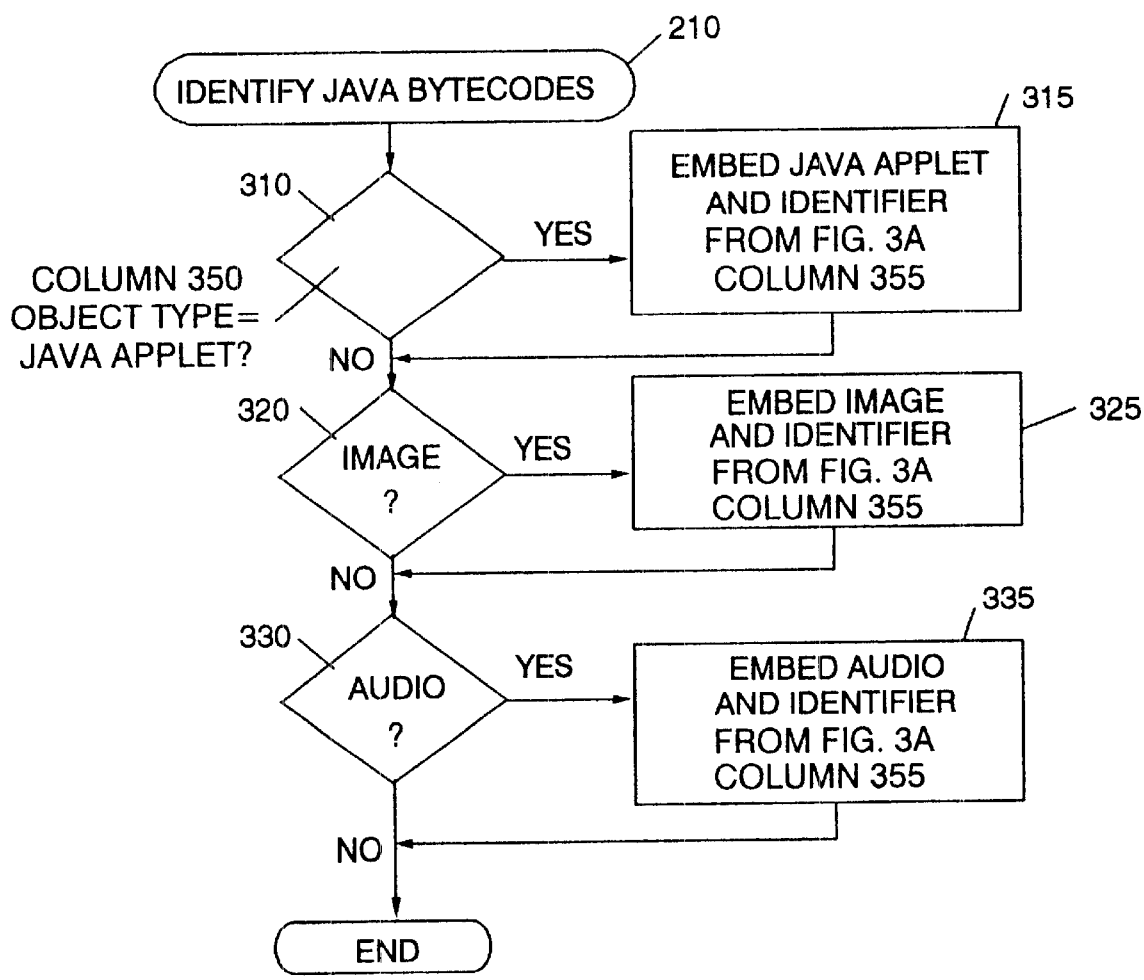

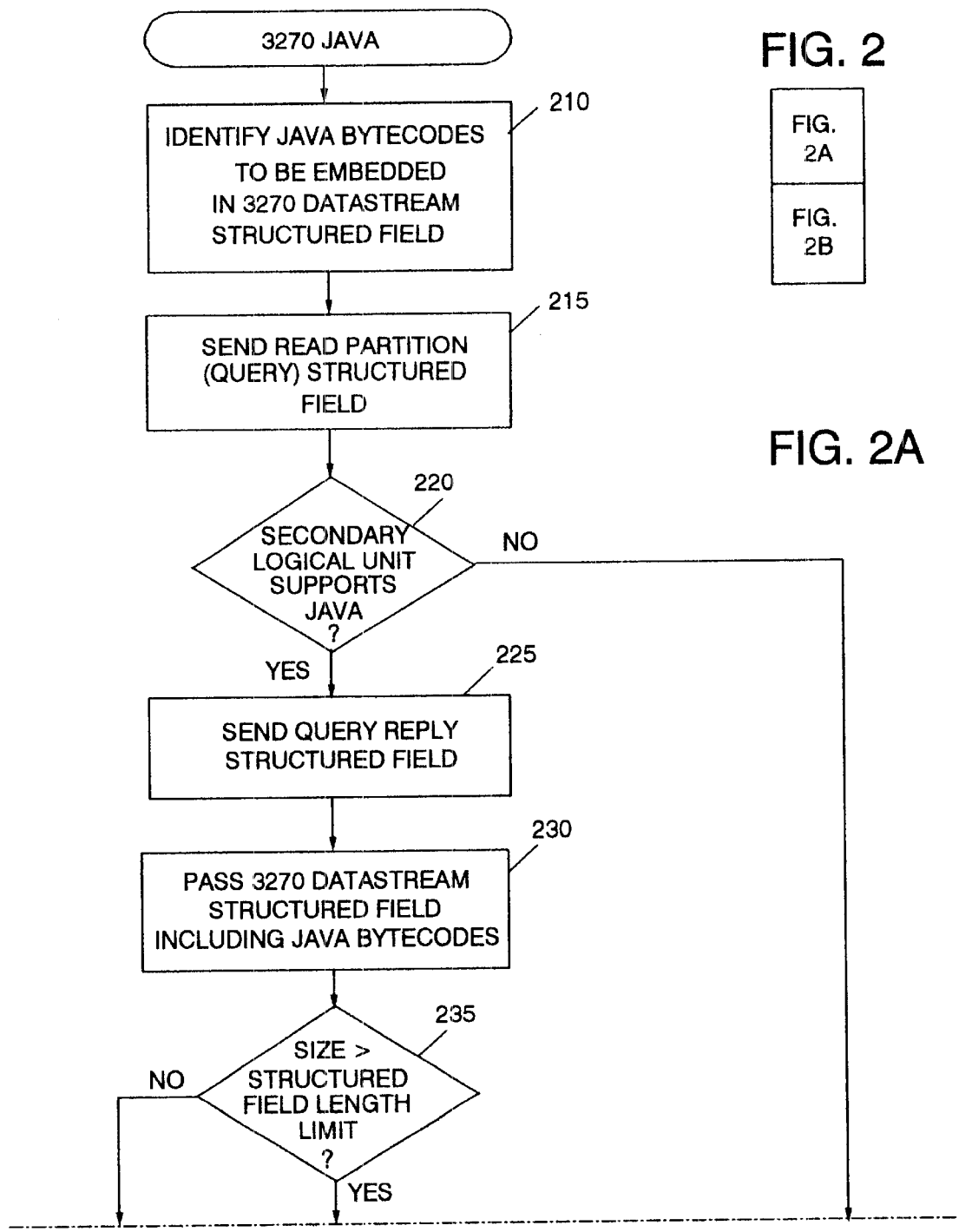

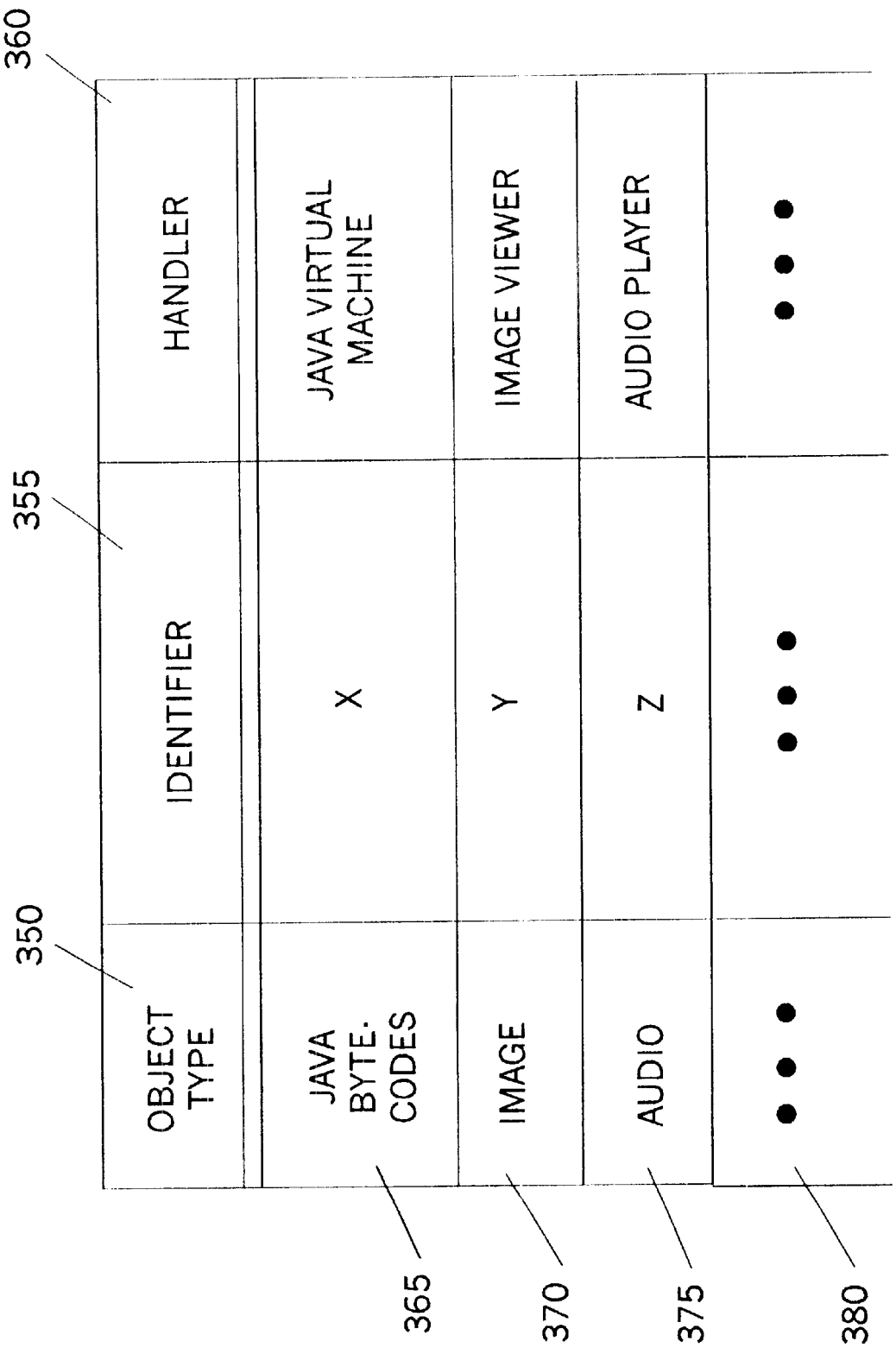

```
JVM          Host                                          Terminal                          JVM
                                                                                              :
                                                                                      (executing)
                                                                                              :
                                                                     request class (classname)
                                                            <------------------------
             RH=Req, BB, OIC, CD                 |
             RU=Java Class Request SF (classname)|
             <------------------------------------
java class   |
request      |
classname)   |
<----------
|
| send class
| (classname)
------------>
             | RH=Reply, EB,OIC, CD
             | RU=Java Applet SF (classname, data)
             ---------------------------------------->
                                                            |reply class(classname,data)
                                                            ---------------------------->
```

FIG. 9

```
    Host                                          Terminal

Image Data (HTML image tag,
    ImageName, display now = no)              Stores ImageName but
    ---------------------------------->       does not display it Image Data (HTML image tag,               Finds ImageName and
    display now = yes, location = 0)          displays it at screen
    ---------------------------------->       buffer offset 0

Image Data (HTML image tag,               Displays a second copy of
    display now = yes, location = 500)        ImageName at buffer
    ---------------------------------->       offset 500.

Image Data (HTML image tag,               Erases ImageName at buffer
    display now = no, location = 0)           offset 0.  This does not
    ---------------------------------->       affect the copy at offset
                                              500.
```

FIG. 10

INTEGRATION OF OBJECTS INCLUDING JAVA BYTECODES WITH LEGACY 3270 APPLICATIONS

CROSS-REFERENCE TO RELATED APPLICATION

This application is related to application Ser. No. 09/073,424, filed concurrently, entitled "Communication of Objects Including Java Bytecodes Between 3270 Logical Units Including Java Virtual Machines", assigned to the assignee of the present invention, the disclosure of which is hereby incorporated herein by reference.

FIELD OF THE INVENTION

This invention relates to data processing systems (apparatus), methods and computer program products, and more particularly to data processing systems, methods and computer program products that use the 3270 datastream architecture.

BACKGROUND OF THE INVENTION

Data processing systems, methods and computer program products that use the 3270 datastream architecture have been widely used for decades. The 3270 datastream architecture has been so widely used, that systems using the 3270 datastream architecture are often referred to as "legacy" systems.

The 3270 datastream architecture is used to communicate between a primary logical unit (LU) and a secondary logical unit using LU2 protocol. It will be understood that the primary and secondary logical units may be mainframe computers, midrange computers, personal computers, terminals, workstations or one or more computer programs that execute on one or more of the above. The 3270 datastream architecture is described in many publications, including but not limited to the "*IBM* 3270 *Information Display System Datastream Programmer's Reference*", published by International Business Machines Corporation (IBM), the assignee of the present application, IBM Publication Number GA23-0059-07, 1992, the disclosure of which is hereby incorporated herein by reference.

As shown in FIG. 1, a data processing system 100 includes a primary logical unit 110 and a secondary logical unit 120 that communicate with each other over a network 130 using the 3270 datastream. The primary logical unit 110 may also be referred to as a host or server, and the secondary logical unit 120 may be referred to as a terminal, workstation, emulator or client. It will be understood that, although FIG. 1 illustrates a simple data processing system 100 including one primary logical unit, one secondary logical unit 120 and a simple network connection 130, the 3270 datastream architecture is generally used to communicate among many primary logical units and secondary logical units using complex network environments. An example of a more typical data processing system using 3270 datastream architecture may be found in U.S. Pat. 5,649,101, entitled "*System and Method for Improving* 3270 *Data Stream Performance by Reducing Transmission Traffic*" to Mathewson II, assigned to the assignee of the present invention, the disclosure of which is hereby incorporated herein by reference.

The 3270 datastream architecture was designed before graphical user interfaces (GUI) became commonplace. Because of the ease of use that a graphical user interface may provide, it is desirable to provide graphical user interfaces for 3270 datastream architecture systems. However, due to the legacy nature of 3270 datastream architecture systems, it is generally desirable to provide graphical user interfaces without requiring rewriting of legacy code or rearchitecting of legacy systems.

One widely used programming language that can provide a rich graphical user interface is Java. As is well known to those having skill in the art, Java programs, in compiled form, are generally portable and will generally run on a wide range of computers and operating systems. Stated differently, Java provides a machine-dependent desktop for executing machine independent applications and applets. Java programs support referencing Universal Resource Locator (URL) identifiers with content types of, for example, audio/basic, audio/x-WAV image/GIF and image/JPEG.

Accordingly, it would be desirable to integrate Java with legacy 3270 applications to obtain the advantages of Java as a portable programming language and the potential cost-savings of Java's centralized application distribution paradigm. However, it would be desirable to integrate Java with legacy 3270 applications without the need to write new legacy applications or to modify existing legacy applications.

Many techniques exist for integrating Java with legacy 3270 applications. These techniques include screen-scraping, an HTML gateway, an object request broker and loading Java classes over LU2 and LU6.2. However, each of these techniques may have shortcomings as described below.

Screen-scraping is a technique of interacting programmatically with the 3270 datastream at the client, in order to combine host data from one or more sources with new program logic and a graphical user interface. The client application gains access to the 3270 data through an application programming interface on a terminal emulator. This program can read the screen contents, issue keystrokes and perform all the other actions that a user could perform. Unfortunately, although it may offer a cosmetic improvement compared to a standard 3270 screen, the screen-scraping application may be vulnerable to a positional change in the host data, such as a date change that shifts data to a new screen offset. Moreover, screen-scraping may also require distributing the application, and subsequent updates to it, to all clients. This problem may be partly overcome by writing the screen-scraper application in Java, if a TCP/IP network over which the Java application could be distributed is available, but this may not automatically confer all of Java's benefits. The client application may still need to be distributed to all the client workstations, or may need to be stored on a separate web server, if having a parallel infrastructure is acceptable. In a large enterprise, however, it may take years to make such a sweeping network change, with all the accompanying administrative hardware and software changes.

A hypertext mark-up language (HTML) gateway is a more general extension of screen-scraping. An HTML gateway is a separate program between a host application and a 3270 emulator. The HTML gateway can convert the entire 3270 datastream to HTML. The client then becomes a browser. An HTML gateway may reproduce the visual appearance of a 3270 screen, or it may interpret the data and convert it into a new graphical user interface representation. It is even possible to read-in the 3270 screen maps residing on the host that are used to format data extracted from a database for 3270 presentation, interpret them and use this augmented information to generate a more tailored HTML screen. Existing products, such as VisualAge for Small Talk Version 3.0 interact with these Basic Mapping Support (BMS) or Message Format Service (MFS) maps.

Unfortunately, HTML gateways may have drawbacks because host applications generally cannot handle unexpected navigational sequences. Thus, if a user presses the browser's Back button to display a previous screen, and then presses a key, causing input to the host application, the application state may not match the data. This could cause a program crash or an undetected logic error that puts incorrect data into a database. Moreover, if the secondary logical unit is at an intermediate gateway rather than at the client, it may be difficult to diagnose faults that occur between the gateway and the client, or to correlate faults at the gateway with the session between the host and the gateway.

Object Request Brokers may be used to replace 3270 datastream communications with object-oriented remote procedure calls. Thus, access to legacy data and legacy applications may be provided by wrapping them in an object wrapper. An Object Request Broker is an example of an object wrapper. Unfortunately, this approach may require monolithic new software development. It may not lend itself to incremental replacement of legacy applications. However, with the large amount of legacy application code that is present, it may not be feasible to replace these applications monolithically. Moreover, remote method invocations and remote procedure calls may not be optimized for the delays and limited bandwidth that are typical of a wide area network, so that performance may be unsatisfactory or degraded.

Finally, Java classes may be loaded by a modified Java class loader that uses LU2 and LU6.2 sessions as its transport. By typing a command on a host command line, a user can invoke the Systems Network Architecture (SNA) for Java class loader. However, this may not integrate Java with the 3270 datastream.

The above survey indicates that although it is generally desirable to integrate Java with legacy 3270 applications, there may be shortcomings with conventional techniques for doing so. Accordingly, there continues to be a need for systems, methods and computer program products for passing Java bytecodes between a primary logical unit and a secondary logical unit that communicate with each other over a network using 3270 datastream architecture.

SUMMARY OF THE INVENTION

It is therefore an object of the present invention to provide improved systems, methods and computer program products for integrating Java into 3270 datastreams.

It is another object of the present invention to integrate Java with legacy 3270 applications without requiring rewriting of legacy applications.

It is yet another object of the present invention to allow incremental integration of Java into legacy 3270 applications.

These and other objects are provided, according to the present invention, by embedding Java bytecodes in a 3270 datastream structured field and passing the 3270 datastream structured field, including the Java bytecodes so embedded, between a primary logical unit and a secondary logical unit that communicate with each other over a network using 3270 datastream architecture. The 3270 datastream structured fields are well known elements of the 3270 datastream architecture that are used to send and receive additional control functions and data. Accordingly, Java applets may be placed on the same computer (the host or primary logical unit), where the legacy applications reside. The benefit of Java's centralized application administration and automatic software distribution may thereby be provided to the host. Moreover, Java bytecodes are transported to the client through the same conduit that transports the 3270 legacy data. Thus, new infrastructure need not be developed, and existing management projects, procedures and tools may be used. Java bytecodes including Java applets, images and/or audio may thereby be integrated with legacy applications, both temporally and spatially. Incremental replacement of legacy applications with new graphical user interface-based Java applications may be provided.

For example, an insurance adjuster application may be enhanced by presenting photographs along with insurance claims data. An employee directory can include an employee's photograph next to the entry. A travel expense reimbursement form can include a graphical user interface calculator or a hot link to the company's travel policy that is stored on a different server. Thus, a new Java applet can be used to annotate an existing legacy application, without the need to change the legacy application itself. It can be used to add more user-friendly help information and/or reduce training costs. Individual panels may be updated to a graphical user interface form incrementally.

Prior to passing the 3270 datastream structured field including Java bytecodes so embedded between the primary logical unit and secondary logical unit, it should be insured that the secondary logical unit supports Java. An initialization protocol according to the present invention sends a Read Partition (Query) structured field from the primary logical unit to the secondary logical unit, to query whether the secondary logical unit supports Java. The secondary logical unit sends a Query Reply structured field to the primary logical unit in response to receipt of the Read Partition (Query) from the primary logical unit if the secondary logical unit supports Java. In response to receipt of the Query Reply structured field from the secondary logical unit, the 3270 datastream structured field including embedded Java bytecodes is passed between the primary logical unit and the secondary logical unit.

Conventional uses of Java applets generally rely on an HTML page to begin. Conventionally, a browser parses the HTML. When the browser encounters an applet tag, the browser requests the applet from the web server, which is generally the same computer from which it received the HTML page. However, according to the present invention, Java applets are activated in a manner which is contrary to convention. More specifically, the 3270 datastream structured field including embedded Java bytecodes is pushed from the primary logical unit to the secondary logical unit under control of the primary logical unit, without receiving a request for the Java bytecodes from the secondary logical unit. Accordingly, HTML pages and/or a web server are not required, and the host application may send the first applet to the secondary logical unit in an unsolicited manner.

The Java bytecodes that are embedded in a 3270 datastream structured field according to the invention may include but are not limited to, Java applets, images and audio. In order to identify the type of object that is embedded, a corresponding Java applet identifier, an image identifier and an audio identifier are provided in the 3270 datastream structured field. By identifying the type of object, the structured field type indirectly indicates the type of viewer that can process the object.

As is known to one skilled in the art, Java applets, images and audio data are often longer than the outbound data length for which 3270 datastream architecture was originally designed and optimized. More specifically, a 3270 structured field can include 32 kilobytes of data. In contrast, images may range from approximately 100 bytes to several megabytes. Audio files may also be quite large, for example from 50 kilobytes to over 1 megabyte. According to the invention, a 3270 datastream technique called "spanning" is used to enlarge amounts of Java bytecodes in 3270 datastream structured fields. More specifically, Java bytecodes of a size that exceeds a structured field length limit are embedded into a plurality of 3270 datastream structured fields. The plurality of 3270 datastream structured fields are spanned between the primary logical unit and the secondary logical unit.

Moreover, the spanned 3270 datastream structured fields may be cached in the secondary logical unit, to thereby reduce latency. More specifically, in a conventional 3270 application, there are often long pauses between data inputs by the user. Spanned chunks of 3270 datastream structured fields with embedded Java bytecodes may be interleaved with the other transmissions in the session, such as character-formatted data sent by the legacy application. The structured fields of image and audio may include a "Display or Play Now" indicator that can be turned on or off. Thus, an application can start sending audio or image data in advance of it being needed. The data is then cached in the secondary logical unit, so that the object can arrive at the secondary unit without a perceptible pause. When the audio is to play or the image is to display, another structured field may be sent referencing the previously sent object by name with a "Display or Play Now" indicator turned on.

To reduce the quantity of data being sent between a host and a client, the present invention also includes an "invoke by reference" syntax by which the host instructs the client to invoke a named, typed object without actually sending the object. If the client already has the object cached from a previous use, the client can invoke the object immediately or later according to the state of the "Display Now" indicator. Otherwise, the client requests the missing object from the host, which supplies it by sending the object in 3270 datastream structured fields. Once the client receives and caches the object, or retrieves it from a cache, the client invokes the object similar to where the host had sent the object itself.

The present invention can also be used with objects other than Java bytecodes. Thus, for example, image, audio and other objects may be integrated with legacy 3270 applications by embedding the object in a 3270 datastream structured field, and passing the 3270 datastream structured field, including the object so embedded, between a primary logical unit and a secondary logical unit that communicates with each other over a network using 3270 datastream architecture.

Accordingly, Java and other arbitrary objects may be integrated with legacy 3270 applications, without requiring the rewriting of legacy applications and allowing the use of highly developed 3270 datastream architecture. Initialization protocols, bootstrapping mechanisms to start a first Java applet, caching, spanning and extending the protocols to arbitrary object types are also provided. It will be understood by those having skill in the art that the present invention may be embodied as methods, apparatus (systems) and/or computer program products.

BRIEF DESCRIPTION OF THE DRAWINGS

FIG. 1 is a simplified block diagram of a conventional data processing system using 3270 datastream communication.

FIG. 3A is a table illustrating the relationship between a defined object type, an object-type identifier that appears in a 3270 datastream structured field according to the present invention, and an object handler corresponding to each specific object type.

FIG. 3B is a flowchart illustrating operations for embedding Java bytecodes and other arbitrary object types including an identifier in a 3270 datastream structured field according to the present invention.

FIGS. 4–10 illustrate specific examples of 3270 datastream structured fields, including embedded Java bytecodes that are passed between a primary logical unit and a secondary logical unit, according to the present invention.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will also be appreciated by one of skill in the art, the present invention may be embodied as methods, systems (apparatus), or computer program products. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Operations for various aspects of one embodiment of the present invention are illustrated in detail in FIGS. 2, 3 and 11–15 which are flowchart illustrations. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps such as was described in FIGS. 2, 3 and 11–15, or by combinations of special purpose hardware and computer instructions.

Figure 2B:
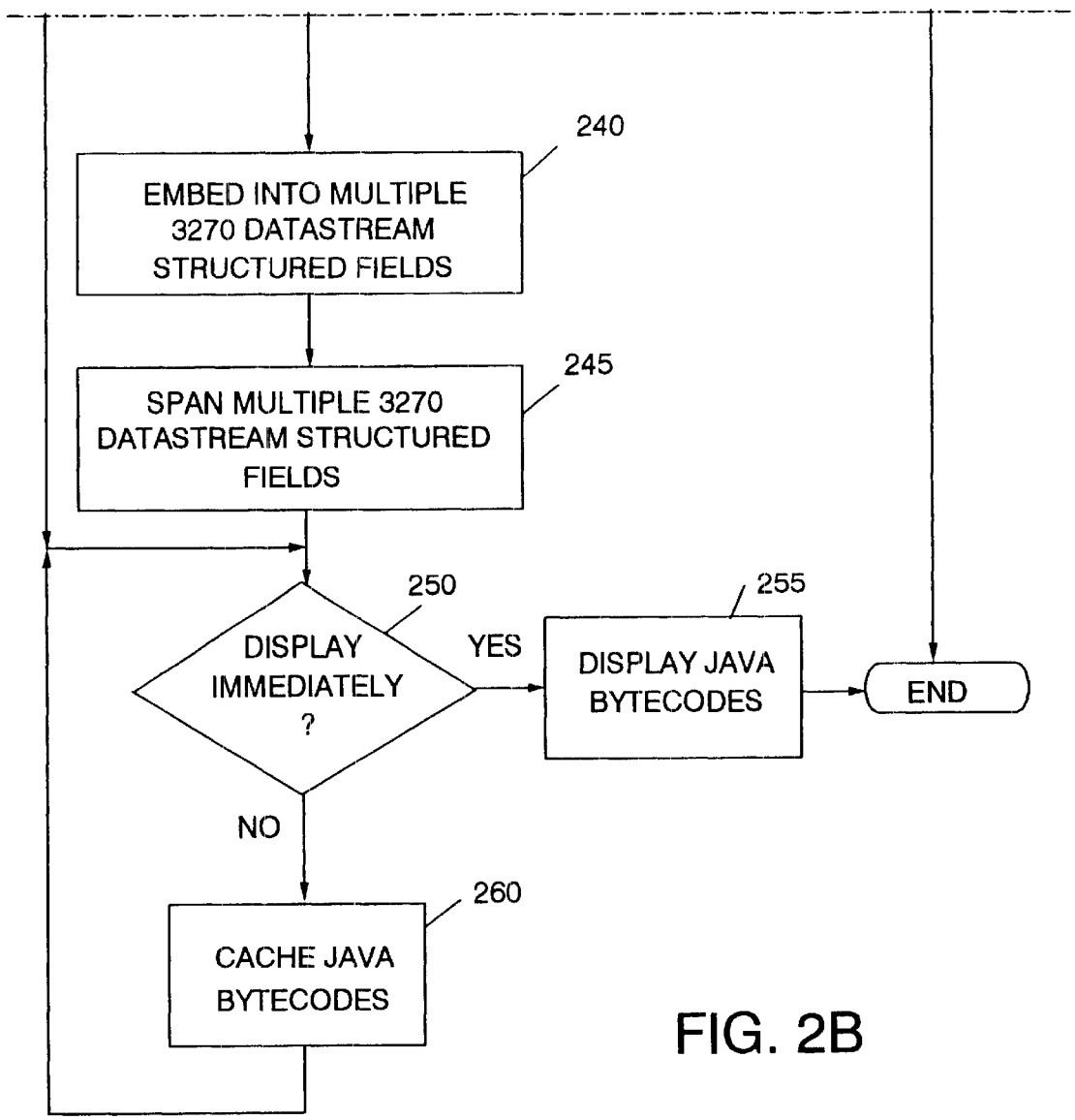
FIG. 2 is a flowchart illustrating overall operations for passing Java bytecodes according to the present invention.
Figure 11:
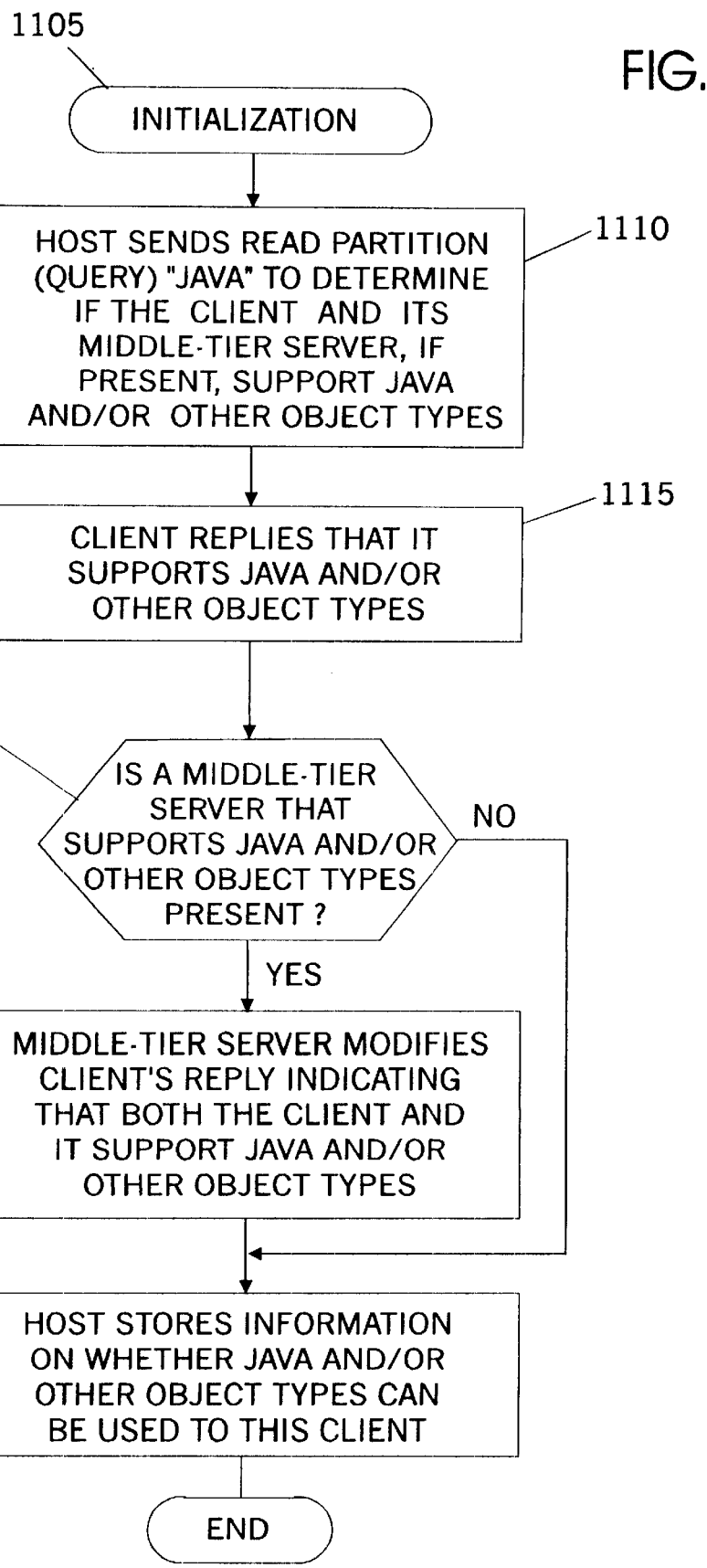
FIG. 11 illustrates initialization logic by which a host can determine whether it may send Java bytecodes and other objects to a client, according to the present invention.

FIG. 2 is a flowchart illustrating overall operations for passing Java bytecodes between a primary logical unit 110 and a secondary logical unit 120 that communicate with each other over a network 130 using 3270 datastream architecture, as was described in connection with FIG. 1. Referring now to FIG. 2, at Block 210, an identification is made of Java bytecodes or other objects that are to be embedded in 3270 datastream structured fields. Modification of conventional structured fields to accept embedded Java bytecodes and other objects will be described in detail below. At Block 215, initialization is performed by sending a Read Partition (Query) structured field from the primary logical unit to the secondary logical unit, to query whether the secondary logical unit supports Java. An example of a Read Partition (Query) structured field is described below. FIG. 11 illustrates a specific embodiment of Blocks 215 and 220, as will be described below.

At Block 220, it is determined whether the secondary logical unit supports Java. If not, operations end. If YES, then at Block 225 a Query Reply structured field is sent from the secondary logical unit to the primary logical unit. An example of a Query Reply structured field is provided below.

At Block 230, the 3270 datastream structured field including Java bytecodes or other objects is then passed between the primary logical unit and the secondary logical unit. As is described in detail below, the 3270 datastream structured field including embedded Java bytecodes can be pushed from the primary logical unit to the secondary logical unit under control of the primary logical unit, without receiving a request for the Java bytecodes from the secondary logical unit. This sharply contrasts with conventional Java applications, wherein an HTML page conventionally requests a Java applet from a web server.

Figure 12:
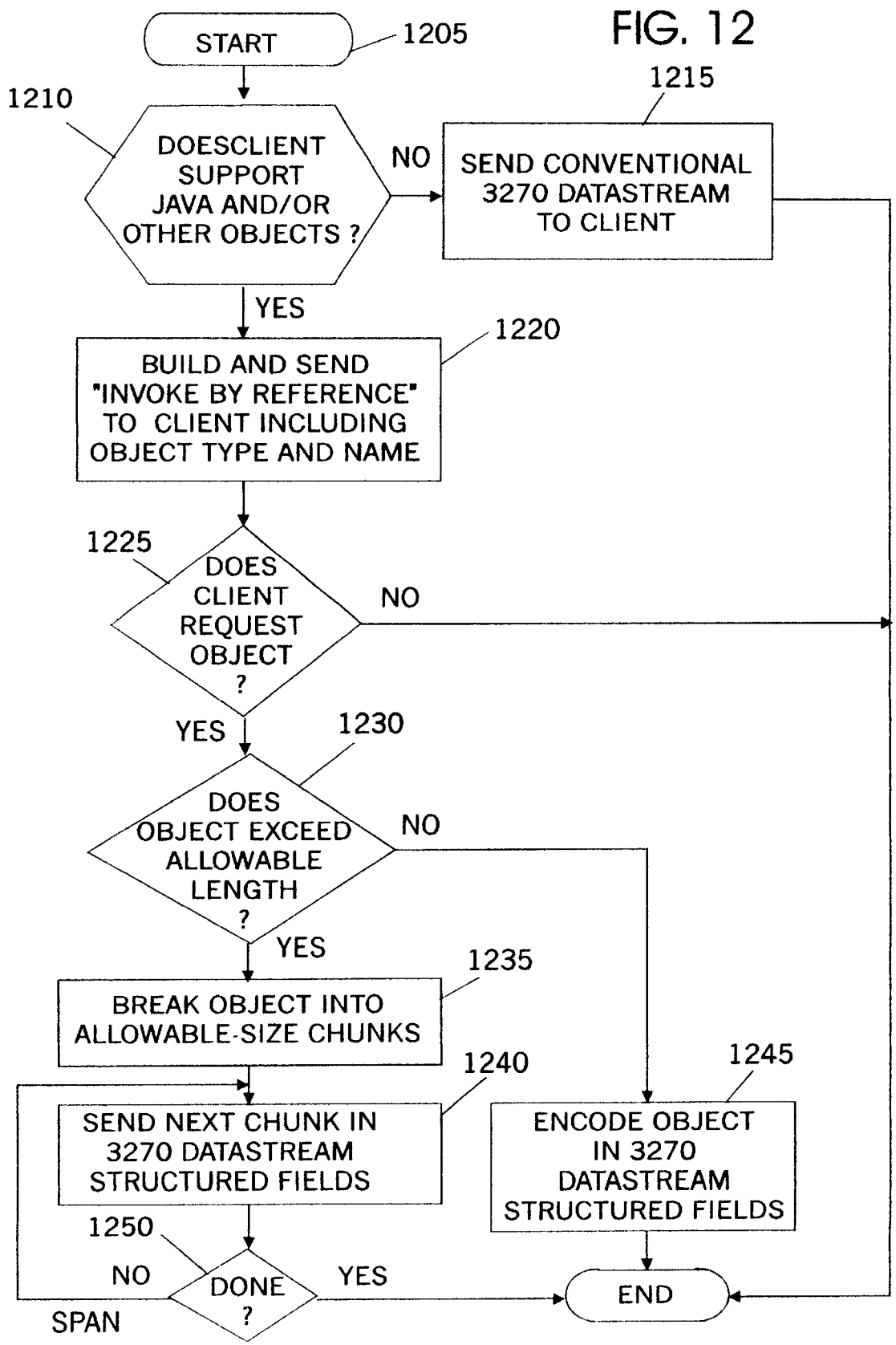
FIG. 12 illustrates logic performed by a host when it desires to send Java bytecodes or other objects to a client, according to the present invention.

At Block 235, a determination is made as to whether the size of the Java bytecodes or other object is greater than the length limit of 3270 structured fields (32 kilobytes). If so, then at Block 240, the Java bytecodes are embedded into multiple 3270 datastream structured fields. Then, at Block 245, the technique of spanning is used to pass multiple 3270 datastream structured fields including embedded Java bytecodes between the primary logical unit and the secondary logical unit. FIG. 12 illustrates a specific embodiment of spanning, as will be described below.

The large Java bytecodes may be spanned from the primary logical unit to the secondary logical unit before they are actually needed for display, so that the plurality of 3270 datastream structured fields are cached in the secondary logical unit. Latency can therefore be reduced. Accordingly, at Block 250, a test is made as to whether the Java bytecodes or other object should be invoked now. It will be understood by those having skill in the art that the term "display" is used herein to encompass the display of an image, the playing of audio, the execution of a Java applet and/or other action appropriate to other arbitrary object types. Accordingly, the 3270 datastream structured fields include an indicator that inhibits display of the Java bytecodes. When the indicator indicates "No Display Now" then the Java bytecodes are cached at Block 260. On the other hand, when the indicator indicates "Display Now", then the Java bytecodes are immediately displayed at Block 255.

As described above, the embedded Java bytecodes (Block 210 of FIG. 2) may include Java applets, images or audio. FIG. 3A illustrates a table associating a given object type with an identifier and a specific object handler appropriate to that object type. Column 350 contains the object types. Column 355 indicates an identifier for the each specific object types to be placed in 3270 datastream structured fields in accordance with this invention. Column 360 indicates the type of object-handler appropriate to each identified object type. Specific object types are listed in rows 365, 370 and 375. For example, the Column-355 identifier corresponding to Java bytecodes signifies that the data should be passed to a Java Virtual Machine for invocation. The Column-355 identifier corresponding to an image object signifies that this specific data type should be passed to an image viewer. A Column-355 identifier signifying audio data indicates that the data should be passed to an audio player application for invocation. It will be apparent to those skilled in the art that this invention is not limited to the three specific data types given as examples here. The invention is capable of passing arbitrary data types for appropriate invocation, so long as the parties communicating agree in advance on the FIG. 3A table. Line 380 signifies that the table may contain other additional rows for additional object types.

FIG. 3B illustrates operations for embedding Java bytecodes or other arbitrary object types, including an identifier, in a 3270 datastream structured field. More particularly, at Block 310, if a Java applet is embedded, then a Java applet and a Java applet identifier are embedded at Block 315. If an image is embedded at Block 320, then the image data and an image identifier are embedded at Block 325. Finally, if audio is to be embedded at Block 330, audio data and an audio identifier are embedded at Block 335. Examples of these identifiers are provided below. It will be understood by those skilled in the art that other arbitrary object types may be handled in the same manner as the Java bytecodes, audio, and image data described in FIG. 3, so long as the parties communicating agree in advance on the content of the table described by FIG. 3A.

A specific implementation of embedding Java bytecodes in a 3270 datastream using structured fields will now be described. As is well known to those having skill in the art, Structured Fields (SF) are the predecessors of the General Data Stream used in SNA peer protocols (LU 6.2, APPN). A structured field generally has a 15-bit length field, 1 or 2-byte Structured Field IDentifier (SFID), two bytes of flags, and context-dependent parameters and/or data. An SF may contain additional variable length fields encoded in Length-Type format with a 1-byte length, 1-byte identifier, and context-dependent data. Specific SFs are defined for outbound or inbound use, or both. Structured Fields are described in detail in Chapters 4 and 5 of the above-cited IBM Reference GA23-0059-07.

The structured fields protocol is functionally rich due to a long history of incremental enhancement. Early in the session, before using the new structured fields, the host sends a WSF command with the only or last SF being Read Partition (Query/Query List, SFID X'1') to determine what structured fields the terminal supports. This query may request that the terminal report all supported SFIDs, or only the specific subset listed in bytes 8-n. The terminal may reject the Read Partition (Query) under certain circumstances described in the IBM reference; otherwise, it replies. The reply may include one or more specific Query Reply SFs, and/or a Query Reply (Summary) that lists all supported SFIDs. A specific embodiment of the initialization protocol is illustrated in FIG. 11.

As described in connection with FIG. 2 at Block 210 and in connection with FIG. 3, Java bytecodes are embedded in 3270 datastream structured fields. Embedding of a Java applet in a structured field will now be described in detail.

The Java Applet SF is used to transmit a Java applet, class file, or a segment thereof if spanning is used, from the server to a client. Each applet or class file in a single transmission is in its own Java Applet SF. A transmission can include multiple SFs:

| Byte | Bit | Content |
|---|---|---|
| 0–1 | | Length of structured field, including this length field (maximum value X'7FFF') |
| 2–3 | | Identifier = X'C000' |
| 4–5 | | Flags |
| | 0–1 | Group |
| | | 00   Continue |
| | | 01   End |
| | | 10   Begin |
| | | 11   Only |
| | 2–15 | Reserved |
| 6–m | | Applet data. The data must support the method "runnable" because it will be passed to a Java Virtual Machine (JVM) for execution. If the data does not support the method "runnable," the client sends a Java Exception SF with a sense data identfying the error. |

Image data may be embedded in a 3270 datastream structured field by providing an image data structured field. This SF is used to send an image file and instructions concerning its presentation. The image itself may be identified by a standard HTML tag and the image data is in a standard format. If the receiver does not support the object type, it sends a Java Exception SF:

| Byte | Bit | Content |
|---|---|---|
| 0–1 | | Length of structured field, including this length field (maximum value X'7FFF') |
| 2–3 | | Identifier = X'C003' |
| 4–5 | | Flags |
| | 0–1 | Group |
| | | 00   Continue |
| | | 01   End |
| | | 10   Begin |
| | | 11   Only |
| | 2 | Display now indicator |
| | | 0   Do not display now |
| | | 1   Display now |
| | 3 | Image data included |
| | 4–15 | Reserved |
| 6–7 | | Screen buffer offset in standard 3270 14-bit format |
| | 8 | Length of HTML image tag |
| 9–m | | HTML image tag in ASCII, e.g. <IMG SRC="Home4.gif" BORDER=0 HEIGHT=50 WIDTH=54> |
| m+1–n | | Image data in the format specified by the image tag, e.g. GIF, JPEG, etc. This field is present if 'image data included' = 1. Otherwise, the structured field ends at byte m, and bytes m+1–n are not present. |

Audio data may also be embedded in a 3270 datastream structured field. Audio data may be embedded by providing an audio data structured field. This SF transmits an audio data file from the host to the client. The audio data may be attached to a "hot spot" on the screen. It plays when the user selects the hot spot with a pointing device. It may also play immediately upon receipt, or be stored for later play. Any part of an audio hot spot that falls outside the presentation space is ignored (truncated) by the emulator. If the receiver does not support the object type, it sends a Java Exception SF. If the 'play now indicator'='play immediately,' 'audio data included'=0, and the HTML audio tag does not name a previously-received audio file, the emulator sends a Java Exception SF with sense data indicating the error. Both 'play now' and 'define hot spot' may be set at the same time, in which case the audio plays upon receipt, and an audio hot spot is defined that may play again in the future.

| Byte | Bit | Content |
|---|---|---|
| 0–1 | | Length of structured field, including this length field (maximum value X'7FFF') |
| 2–3 | | Identifier = X'C005' |
| 4–5 | | Flags |
| | 0–1 | Group |
| | | 00   Continue |
| | | 01   End |
| | | 10   Begin |
| | | 11   Only |
| | 2 | Play now indicator |
| | 3 | Define audio hot spot indicator |
| | 4 | Audio data included |
| | 5–15 | Reserved |
| 6–9 | | Audio hot spot definition: present if 'define audio hot spot indicator' = 1; otherwise, reserved |
| 6–7 | | Coordinates of upper left corner of hot spot to which the audio clip is attached: specified as a screen buffer offset in standard 3270 14-bit format |
| 8 | | Width, in columns   (X'0'–X'4F') |
| 9 | | Height, in rows    (X'0–X'83') |
| 10 | | Length of HTML audio tag |
| 11–m | | HTML audio tag in ASCII (includes the audio file name) |
| m+1–n | | Audio data in the format specified by the HTML audio tag (standard.AIFF, .WAV, etc. format). Present if 'audio data included' = 1. Otherwise, the structured field ends at byte m, and bytes m+1–n are not present. |

Figure 4:
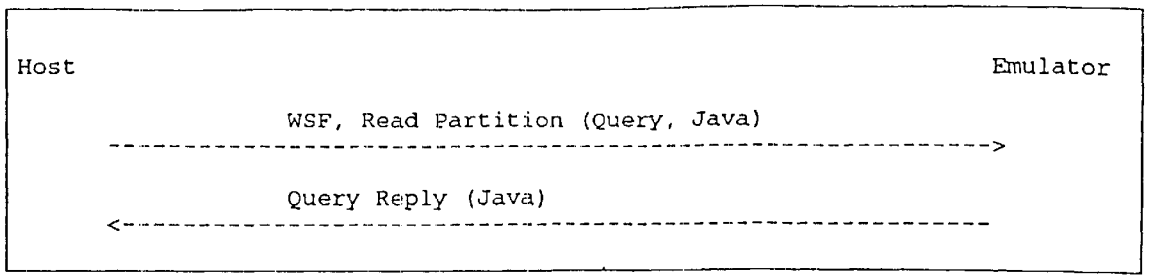

As described above in connection with Blocks 215, 220 and 225, initialization may proceed by sending a Read Partition (Query) structured field from the primary logical unit to the secondary logical unit to query whether the secondary logical unit supports Java. The initialization protocol is described in FIG. 4, where the primary logical unit is referred to as the Host and the secondary logical unit is referred to as the Emulator.

The existing Read Partition (Query) SF is modified to allow a host to explicitly query a 3270 client for Java support. The following description only shows the fields of Read Partition (Query) that relate to Java. Fields not shown are unchanged:

| Byte | Bit | Content |
|------|-----|---------|
| 0–1  |     | Length of structured field, including this length field |
| 2    |     | SFID = X'01' Read Partition |
| 3    |     | Partition ID |
|      |     | X'FF' Query operations |
| 4    |     | Type |
|      |     | X'02'  Query (all) |
|      |     | X'03'  Query List |
| 5    | 0–1 | Request type |
|      |     | 00   QCODE List |
|      |     | (used when byte 4 indicates Query List) |
|      |     | 10   All (used when byte 4 indicates Query All) |
|      | 2–7 | Reserved (zeroes) |
| 6–n  |     | QCODE |
|      |     | Lists the Query Reply codes requested, when the Type (byte 4) indicates Query List; otherwise, the Read Partition (Query) length is 6 bytes and this field is absent. X'C0' Java support. May also list other QCODEs supported by the emulator. |

This existing Query Reply SF is modified so a 3270 client may indicate its support for all the SFs for Java:

| Byte | Bit | Content |
|------|-----|---------|
| 0–1  |     | Length of structured field, including this length field |
| 2    |     | SFID = X'81' Query Reply |
| 3    |     | QCODE |
|      |     | X'C0' Java support (client only) |
|      |     | X'C1', Java support (client and middle-tier server) |
|      |     | X'C2' Java support (middle-tier server only) |

Accordingly, the host sends Read Partition (Query) with the QCODE set to "Java", or Read Partition (Query List) with a QCODE of "Java" in the list. An emulator receiving one of these flows can assume that the host supports Java, and it replies by sending Query Reply (Java). It will be understood that the "Java" QCODES may be construed to indicate support for multiple object types by prior agreement of the parties.

Figure 5:
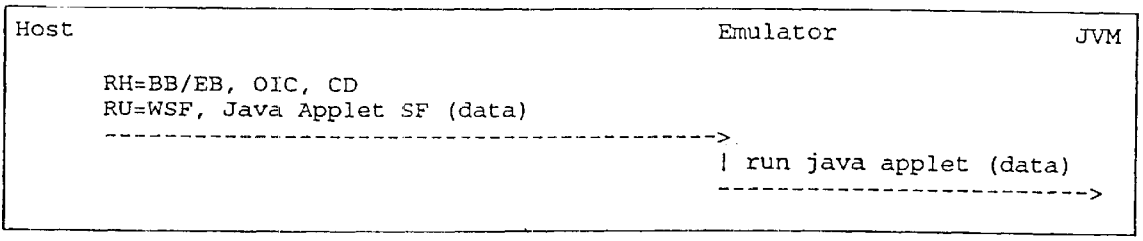

As also described above, after a Query Reply structured field is received at Block 225 of FIG. 2, 3270 datastream structured fields including Java bytecodes are passed at Block 230. According to the invention, the first (or any) Java applet that is passed may be bootstrapped as described in detail in FIG. 5. More specifically, conventional uses of Java applets generally rely on an HTML page to get started. The browser parses the HTML. When it encounters an applet tag, it requests the applet from the web server, which is generally the same computer from which it received the HTML page.

In contrast, the present invention does not require HTML pages or a web server. A host application may push the first (or any) applet to the emulator unsolicited. This applet should support the method "runnable". The emulator first waits for the end of a spanned transmission, to ensure that it has received all the bytecodes. It reassembles the byte stream into executable Java bytecodes, creates or selects a window in which the Java application can display its output, and passes the bytecodes to the JVM for execution. The location and size of this window, relative to the contents of the 3270 presentation space, and the manner in which it will terminate, can be specified in the structured field. This enables the Java application developer to integrate the Java applet's visual presentation with the existing character-based display, display it in an independent presentation space, or replace it altogether. This decision can be made on a screen-by-screen basis, supporting incremental replacement of the legacy application. The "push" concept may be applied to other object types as well.

Figure 6:
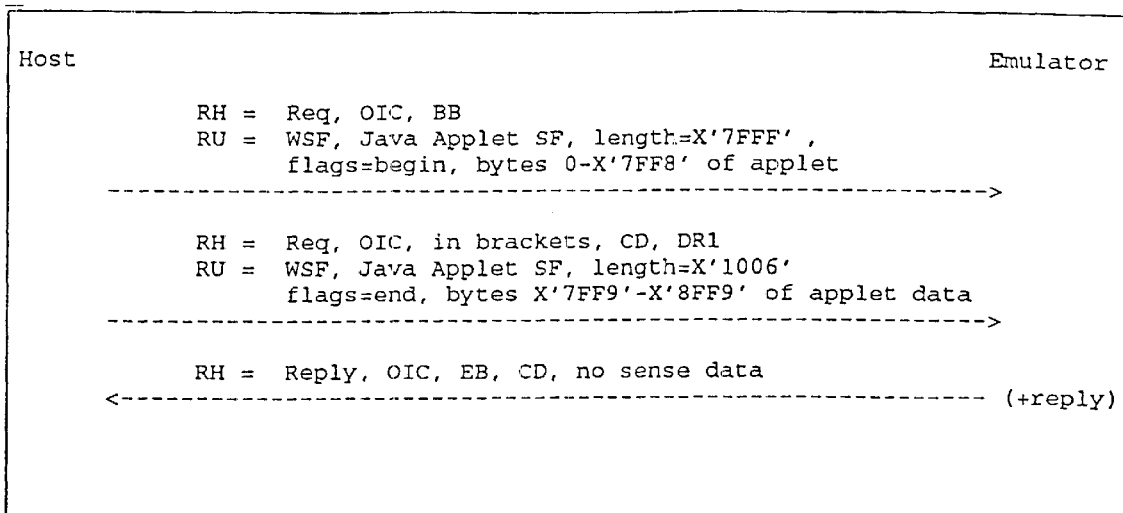

As described in Blocks 235–260, Java classes, audio and image data are often longer than the outbound data length for which 3270 was originally designed and optimized. Images may range from 100 bytes to megabytes. Typical image sizes will be similar to those conventionally downloaded from the internet today—from hundreds of bytes to 10 K–64 KB or more. Audio files may be quite large (50 k to >1 MB). Practical considerations will tend to keep them relatively small, just as they tend to be kept small on the internet. According to the invention, an existing 3270 facility referred to as "spanning", is used to send a large piece of data in chunks. FIG. 6 illustrates spanning of multiple 3270 datastream structure fields. A specific embodiment of spanning will be illustrated in FIGS. 12 and 14.

Figure 7:
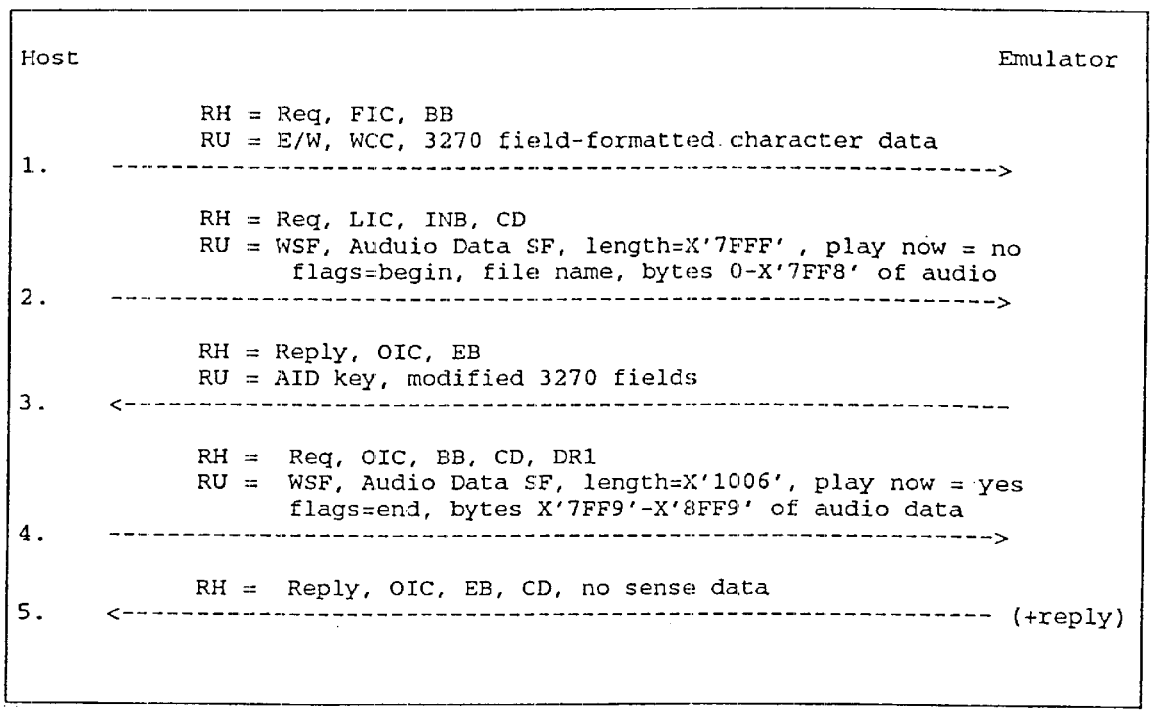
Figure 8:
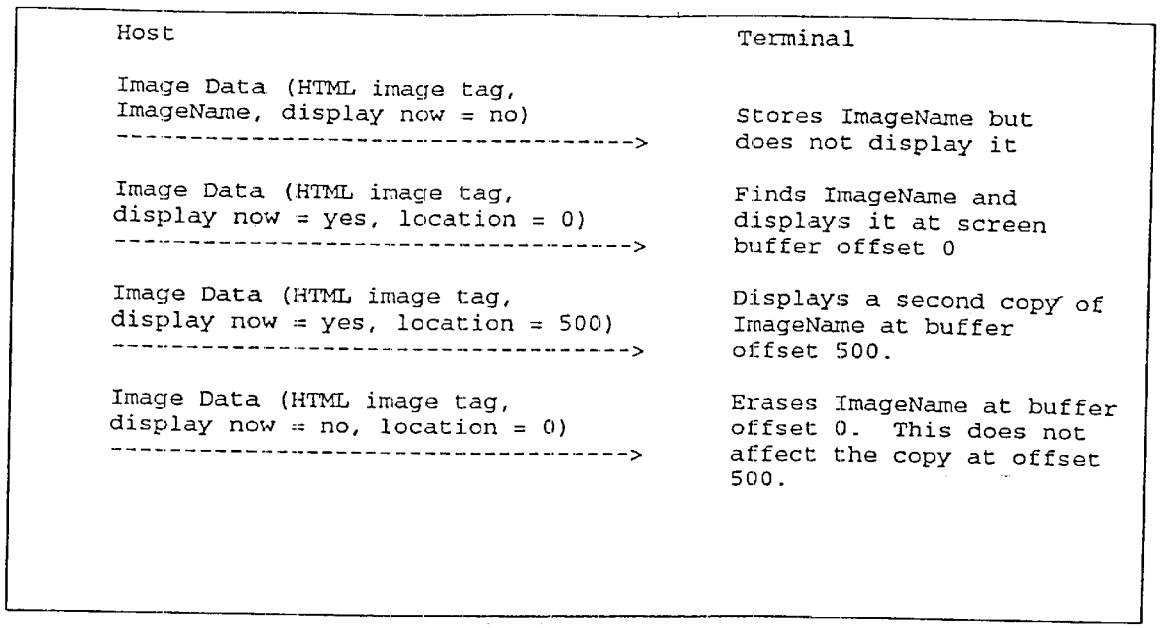
Figure 13:
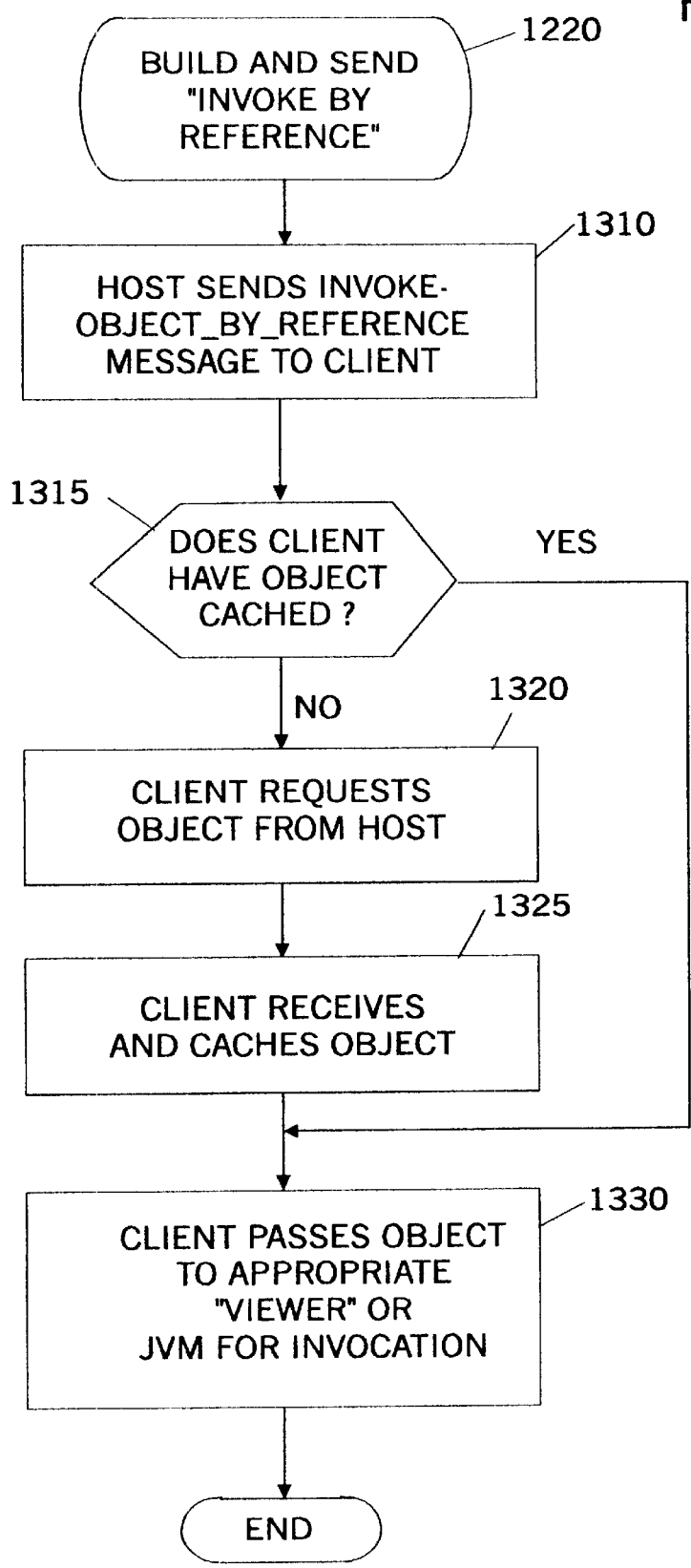
FIG. 13 illustrates a protocol that may be used by a host to instruct a client to invoke in a specific object by reference, according to the present invention.

In a typical 3270 application, there are generally long pauses between data inputs by the user during which data transmission is idle. The present invention can take advantage of those pauses by interleaving spanned chunks with other transmissions on the session, such as character-formatted data sent by the legacy application. The structured fields for image and audio include a "display immediately" indicator that can be turned on or off. This allows a well-designed application to start sending audio or image data, or other objects, in anticipation of the data being needed. This may provide enough time for the object to arrive without a perceptible pause. See FIG. 7. When the audio is to play or the image is to display, another SF is sent referencing the previously-sent object by name, with the "display-now" indicator turned on, as illustrated in FIG. 8. FIG. 13 illustrates a specific embodiment of this aspect of the invention.

A Java class is a file. A class may refer to other classes, which the client requests as needed. The client can load additional classes by sending a Java Class Request SF. The reply is a Java Applet SF (or multiple ones, if spanned) that the emulator passes to the JVM when complete. See FIG. 9.

Previously, an image could be sent and displayed as part of a Java applet, but it was up to the programmer to ensure that the image's location, scale, timing, and palette were coordinated with the 3270 presentation space. It also generally required installing the application code (e.g., a HLLAPI application) on the client.

To improve the integration of 3270 and Java, the present invention can include special SFs for images as described above. An image may be sent and displayed at once, sent and displayed later, redisplayed at different or multiple locations, or removed. The coordinates and dimensions are specified in terms of a 3270 screen buffer offset so the image can be coordinated with the 3270 character data being presented simultaneously. It is not an error to specify an image location such that part of the image is off the screen. The emulator displays the portion that falls within the presentation space and truncates the rest. To remove an image that is currently displayed, the Image Data SF is sent with the 'display now indicator'=0 and the location from which the image should be deleted. Deleting an image restores the 3270 screen buffer characters and attributes that were at that location. Overlaying an image on another image does not remove the previous image; it merely hides it (or part of it). However, deleting an image restores the 3270 screen buffer where the image was, rather than displaying images that were hidden by the deleted image. See FIG. 10.

It might be possible to send a stream of packets (e.g., streaming audio) to the client if sufficient bandwidth and processing resources are available. Audio compression at 2400 bps produces acceptable (if not high fidelity) results. With sufficient buffering (for example, 15 seconds), large amounts of jitter caused by contending 3270 sessions can be accommodated. The existence of streaming audio on the Internet illustrates that this is acceptable. The application sends a stream of individual Audio Data SF packets with the Play Immediately indicator set.

The following additional structured fields may be provided in accordance with the present invention. A Java client on the emulator may send the following SF to invoke a Java method on the host. It can also be used for the host's reply:

| Byte | Bit | Content |
| --- | --- | --- |
| 0–1 | | Length of structured field, including this length field (maximum value X'7FFF') |
| 2–3 | | Identifier = X'C002' |
| 4–5 | | Flags |
| | 0–1 | Group |
| | | 00 Continue |
| | | 01 End |
| | | 10 Begin |
| | | 11 Only |
| | 2–15 | Reserved |
| 6–n | | Application data |

A Java client on the host can send the following SF to invoke a Java method on the emulator. It can also be used for the emulator's reply:

| Byte | Bit | Content |
| --- | --- | --- |
| 0–1 | | Length of structured field, including this length field (maximum value X'7FFF') |
| 2–3 | | Identifier = X'C001' |
| 4–5 | | Flags |
| | 0–1 | Group |
| | | 00 Continue |
| | | 01 End |
| | | 10 Begin |
| | | 11 Only |
| | 2–15 | Reserved |
| 6–n | | Application data |

The following SF may be sent from the emulator to the host to request a Java class file. The reply is a Java Applet SF:

| Byte | Bit | Content |
| --- | --- | --- |
| 0–1 | | Length of structured field, including this length field (maximum value X'7FFF') |
| 2–3 | | Identifier = X'C008' |
| 4–5 | | Flags |
| | 0–1 | Group |
| | | 00 Continue |
| | | 01 End |
| | | 10 Begin |
| | | 11 Only |
| | 2–15 | Reserved |
| 6–n | | Class file identification |

The following SF may be sent by either the server or the client to indicate that it did not understand or could not perform a function requested by one of these SFs.

| Byte | Bit | Content |
| --- | --- | --- |
| 0–1 | | Length of structured field, including this length field (maximum value X'7FFF') |
| 2–3 | | Identifier = X'C007' |
| 4–5 | | Flags |
| | 0–1 | Group |
| | | 00 Continue |
| | | 01 End |
| | | 10 Begin |
| | | 11 Only |
| | 2–15 | Reserved |
| 6–n | | Exception data |

FIGS. 11–15 illustrate a specific embodiment of the present invention.

FIG. 11 illustrates an initialization procedure that is performed by the host at least once (exactly once in a preferred embodiment) per client per session. The host performs the procedure, which begins at Block 1105, either immediately after session establishment, or preceding the first time the host wishes to send Java bytecodes or other objects to a specific client. In Block 1110, the host sends a conventional 3270 datastream Read Partition Query with a QCODE "Java" to determine if the client, and any middle-tier server that may be present on the path between the host and the client, supports Java bytecodes and other arbitrary object types defined by this invention. In Block 1115, a client replies using a conventional 3270 datastream Query Reply with a new "Java" parameter indicating that it does support Java bytecodes and/or other arbitrary object types defined by this invention.

Block 1120 indicates that Block 1125 is performed conditionally only when there is a middle-tier server present along the path between the client and the host that supports Java and other arbitrary object types in accordance with this invention. If so, at Block 1125, the middle-tier server modifies the Query Reply built by the client in Block 1115 to indicate the middle-tier server's support for Java, in addition to that indicated by the client. This indication is cumulative so the host can determine from the reply whether only the client, only the middle-tier server, or both the client and middle-tier server support this invention. In Block 1130, the host receives the Query Reply sent by the client and possibly modified by a middle-tier server. The host stores information on the Java capabilities of the specific client queried and the path to the client. The information is tested in FIG. 12, Block 1210, as will be described subsequently.

FIG. 12 illustrates detailed operations when a host sends Java and/or other arbitrary objects types to a client within a 3270 datastream. Operations start at Block 1205. In Block 1210, the host tests stored information as to the client's Java capabilities, obtained by means of the initialization procedure illustrated in FIG. 11 and stored at Block 1130 therein. If Java is not supported, the host performs Block 1215; it treats the client as a conventional 3270 datastream client and sends it standard 3270 datastream, excluding Java bytecodes or other arbitrary objects defined by this invention. However, if in Block 1210 the stored data indicates that the specific client and the path to the client does support Java, the host proceeds to Block 1220 in which it builds and sends to the client a 3270 datastream structured field in accordance with the present invention that instructs the client to invoke a certain named, typed object by reference, rather than by sending the entire object at this time. Block 1220 will be explained below with reference to FIG. 13.

In Block 1225, if no request is received by the host from the client for the object referenced in Block 1220, operations of FIG. 12 end. Otherwise, the host delivers the specified object to the client, as shown by Blocks 1230–1250. In Block 1230, the host tests the length of the Java bytecodes or other arbitrary object that is to be delivered to the client. If the object's length exceeds the length allowable in a 3270 datastream structured field, the host performs a procedure well-known to those skilled in the art known as "spanning", illustrated by Blocks 1235, 1240 and 1250.

In the first step of spanning, Block 1235, the host breaks the Java bytecodes or other object into allowable-sized chunks. In Block 1240, the host encodes a chunk to be sent in 3270 datastream structured fields and sends it to the client. Block 1250 tests to determine if any more chunks remain to be sent. If so, the spanning operation loops back and repeats Blocks 1240 and 1250. If in Block 1230 the object could fit into a single 3270 datastream structured field, in Block 1245 the host encodes the object in a single 3270 datastream structured field transmission and sends it to the client without spanning, whereupon the operations of FIG. 12 end.

FIG. 13 illustrates operations between a host and a client wherein the host need not always send to the client the entire Java bytecodes or other arbitrary object. Rather, the host may instruct the client, by means of a message encoded in a 3270 datastream structured field, to examine the client's cache for the desired object, identified by name and type, and to invoke the object if present. Otherwise, the client can request the host to deliver the object to the client.

The operations of FIG. 13 correspond to Block 1220 in FIG. 12. In Block 1310, the host builds and sends to the client a 3270 datastream structured field message instructing the client to invoke a particular named, typed object. "Invoke" as used herein means to perform an action upon the object appropriate to the specific object type. The relationship between a specific object type and a specific object-handler performing the "invoke" action upon the object-type was previously described in reference to FIG. 3A and will be further expanded with reference to FIG. 14.

Figure 14A:
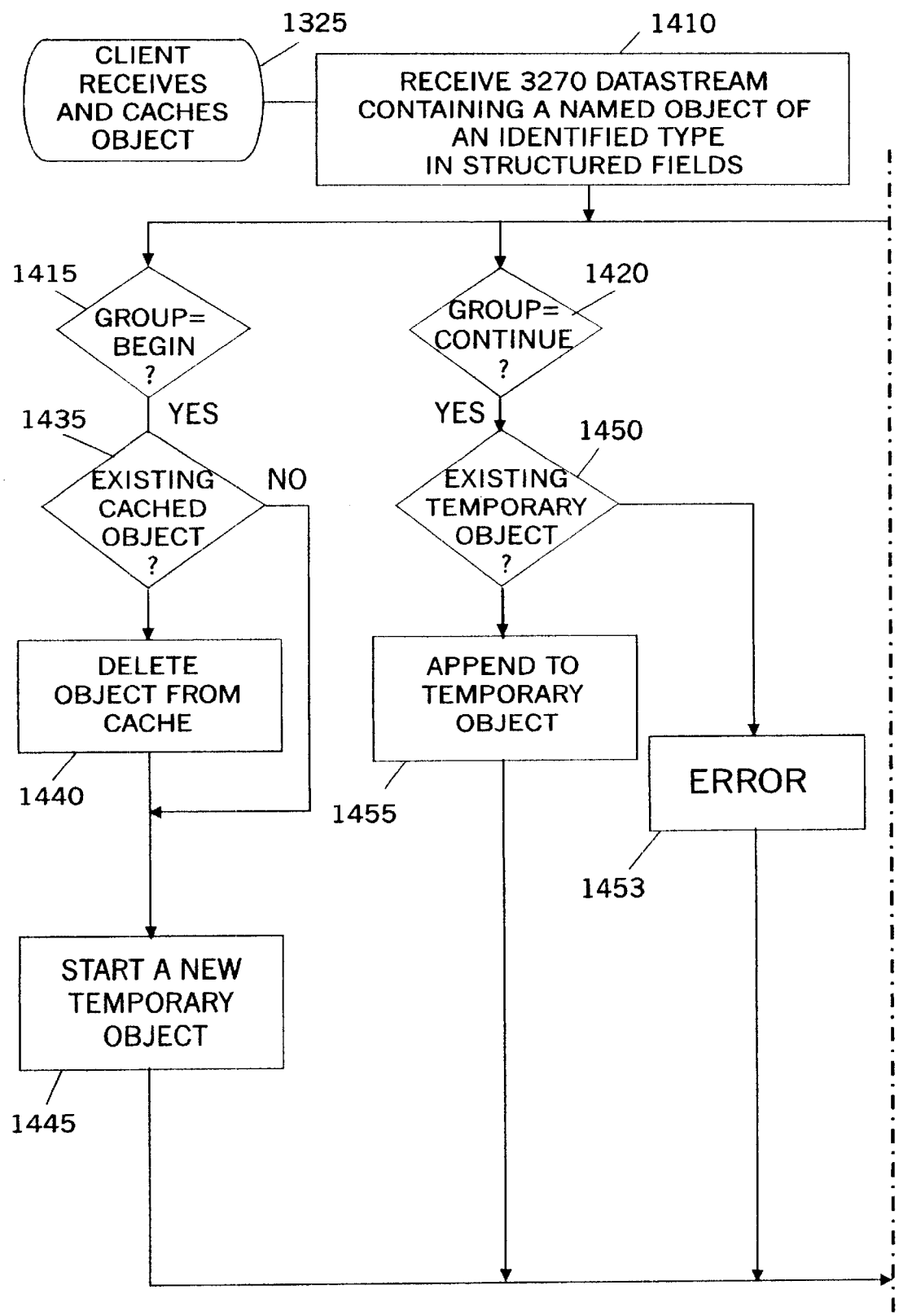
FIG. 14 is a flowchart illustrating operations performed at a client to receive and cache spanned objects according to the present invention.
Figure 14B:
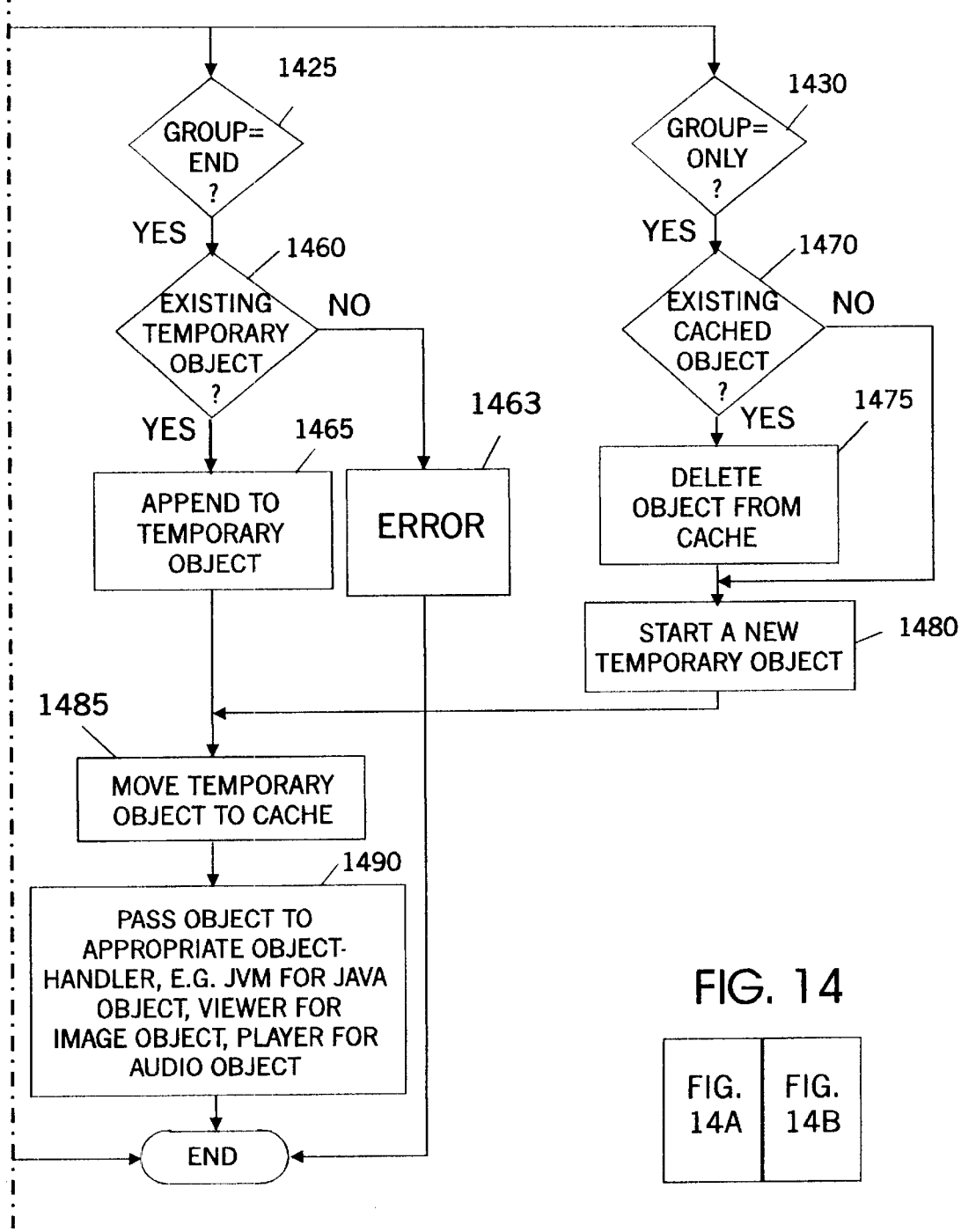
Figure 14:
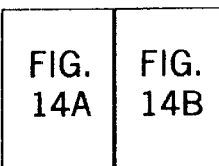

In Block 1315, the client determines whether it already has the object. If so, the client next executes Block 1330, to be described subsequently. If not, the client executes Blocks 1320 and 1325. To request a named, typed object from the host, in Block 1320 the client builds and sends to the host a 3270 datastream structured field message requesting the specific object from the host. In Block 1325, the client receives and caches the object so requested. FIG. 14 will provide a detailed illustration of detailed operations for Block 1325 in FIG. 13.

In Block 1330, the client passes the object referenced in Block 1310, whether already present in cache or obtained by request to the host, to an "object-handler" application appropriate for the specific object type. For example, if the object type is "Java bytecodes", the client passes the bytecodes to a Java Virtual Machine for execution. If the object type is "image", the client passes the image to a display application. If the object type is "audio data", the client passes the audio data to a player application. It will be understood by one of skill in the art that other object types can be sent and invoked using the mechanism defined by this invention, so long as the client and host agree in advance on conventions associating each given object type with the appropriate object handler application.

FIG. 14 illustrates operations at a client in receiving and caching objects that maybe spanned. FIG. 14 corresponds to Block 1325 in FIG. 13. In Block 1410, the client receives a 3270 datastream structured field containing a named object of an identified type. Such receipt may occur either as a result of the host pushing Java bytecodes or other object types to the client unsolicited, or as a result of the host delivering an object to the client upon the client's request, following the "invoke by reference" instruction shown in Block 1310.

In Blocks 1415–1430 the client tests the 2-bit "group" field in the 3270 datastream structured field to determine if this field indicates the beginning of a spanned object, the continuation of a spanned object previously begun, the end of the spanned object previously begun, or a non-spanned object, respectively. If the Block 1415 test indicates "begin," the client performs the test in Block 1435 to check if the named, typed object is already in its cache. If so, it performs Block 1440 and deletes the object from its cache. Now it can resume the common operation of Block 1445 to store the first piece of the received object into a named temporary storage location.

If the Block 1420 test indicates that the structured field is a continuation of an object, the client performs the Block 1450 test to find the temporary storage location for the continued object. If not found, an error has occurred as indicated by Block 1453 and the client discards the incomplete or erroneous structured field data. Otherwise, in Block 1455 the client appends the new data to the temporary storage location. If the Block 1425 test indicates that the data is the last piece of a spanned object, the client checks for the existence of the temporary storage location in which it has been assembling the pieces of the spanned object. If the Block 1460 test is false, an error has occurred and Block 1463 indicates that the client discards the erroneous structured field data.

Otherwise in Block 1465, the client appends the data in the structured field to the temporary logic storage location. In Block 1485, now that the complete object data has been received, the client moves the temporary object into the cache where it may be referenced by future Block 1310 "invoke-by-reference" procedures. Finally, in Block 1490, the client passes the object to the appropriate object-handler for invocation as will be described subsequently in FIG. 15. If the Block 1430 test indicates that the data is not spanned, the client performs the Block 1470 test and if the object is in cache, in Block 1475 it deletes the object from its cache. The client then copies the non-spanned object data into a temporary storage location in Block 1480. It then executes the previously-mentioned logic of Blocks 1485 and 1490.

Figure 15:
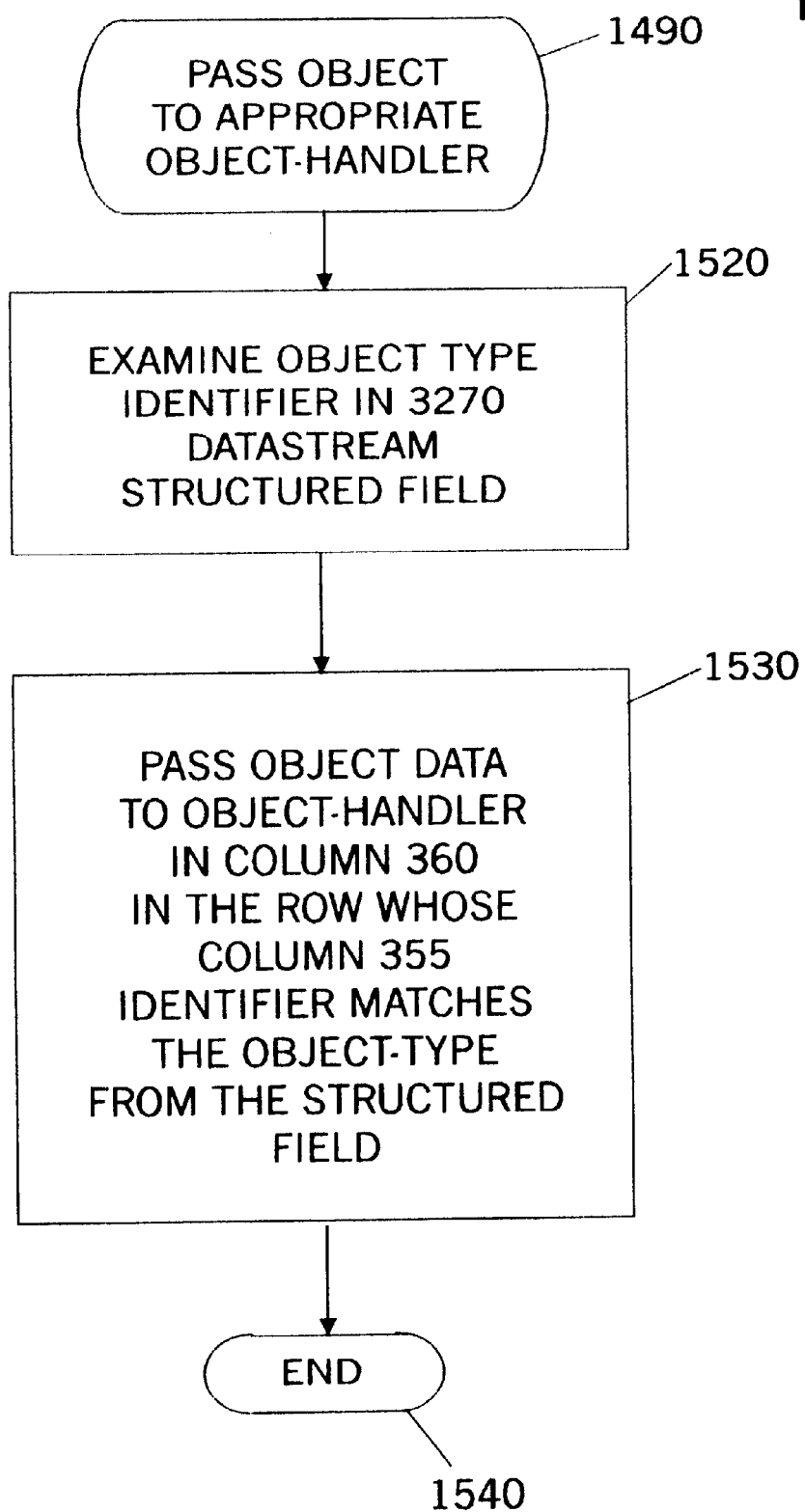
FIG. 15 illustrates the client's routing of an object to a corresponding object handler, according to the present invention.

FIG. 15 illustrates a client's operations upon receiving a complete object when the invocation of the object is not inhibited. FIG. 15 corresponds to Block 1490 of FIG. 14 and refers to the table of FIG. 3A. In Block 1520, the client examines the object-type identifier in the 3270 datastream structured field by comparing it with the entries in each row of column 355 in the table of FIG. 3A. In Block 1530, when the client finds a Column-355 identifier matching that in the received 3270 datastream structured field, the client passes the object to the specific object-handler listed in a column 360 of the same row of said table. Thus, if the client receives a Java bytecode object, the table directs the client to pass the object to the JVM, in response to a "invoke by reference" message or an unsolicited invocation with the "display now" indicator from the host.

Many new capabilities may be provided by integrating Java with legacy 3270 applications. For example, selectable hot spots may be provided on the 3270 screen that can change when the pointing device moves across them. Graphics, animation, audio and/or video can be initiated from within a 3270 application. Improved throughput may be obtained by local checking of input fields to reduce the number of host interactions. Local graphical user interface-based help screens can be provided that can be selected from an existing 3270 application. Remote method invocations may also be provided between the client and host, initiated by either party. Finally, 3270 character-based visual structures can be manually replaced with graphic user interface elements such as buttons instead of PF keys, scroll-down selection fields instead of lists, radio buttons, pull-down lists and check boxes, which may also be automatically generated from 3270 screen maps. Accordingly, Java in 3270 can help meet the need to provide access to enterprise data and new Java applications from any platform, especially those already in place, across any network.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A system for passing Java bytecodes between a primary logical unit and a secondary logical unit that communicate with each other over a network using 3270 datastream architecture, the system comprising:

means for embedding Java bytecodes in a 3270 datastream structured field; and means for passing the 3270 datastream structured field including the Java bytecodes so embedded, between the primary logical unit and the secondary logical unit.

2. A system according to claim 1 further comprising:

means for determining whether the secondary logical unit supports Java;

the passing means being responsive to the determining means, to pass the 3270 datastream structured field including the Java bytecodes so embedded, if the secondary logical unit supports Java.

3. A system according to claim 2 wherein the primary logical unit and the secondary logical unit communicate with each other via a middle tier server, the system further comprising:

means for determining if the middle tier server supports Java;

the passing means being responsive to the determining means, to pass the 3270 datastream structured field including the Java bytecodes so embedded, if the secondary logical unit and the middle tier server both support Java.

4. A system according to claim 2 wherein the determining means comprises:

means for sending a Read Partition (Query) structured field from the primary logical unit to the secondary logical unit, to query whether the secondary logical unit supports Java; and means for sending a Query Reply structured field from the secondary logical unit to the primary logical unit in response to receipt of the Read Partition (Query) from the primary logical unit, if the secondary logical unit supports Java;

the passing means being responsive to receipt of the Query Reply structured field from the secondary logical unit.

5. A system according to claim 1 wherein the means for embedding Java bytecodes in a 3270 datastream structured field comprises:

means for embedding a Java applet and a Java applet identifier in a 3270 datastream structured field.

6. A system according to claim 1:

wherein the means for embedding comprises means for embedding Java bytecodes of a size that exceeds a structured field length limit into a plurality of 3270 datastream structured fields; and wherein the means for passing comprises means for spanning the plurality of 3270 datastream structured fields between the primary logical unit and the secondary logical unit.

7. A system according to claim 6 further comprising:

means for caching the plurality of 3270 datastream structured fields in the secondary logical unit to thereby reduce latency.

8. A system according to claim 7 wherein the means for spanning comprises means for spanning the plurality of 3270 datastream structured fields including an indicator that inhibits invocation of the Java bytecodes, between the primary logical unit and the secondary logical unit.

9. A system according to claim 7 further comprising:

means for invoking the Java bytecodes by reference;

means for testing whether the Java bytecodes that are invoked by reference are cached in the secondary logical unit; and means for requesting the Java bytecodes from the primary logical unit if the Java bytecodes that are invoked by reference are not cached in the secondary logical unit.

10. A system for passing Java bytecodes from a primary logical unit to a secondary logical unit that communicate with each other over a network using 3270 datastream architecture, the system comprising:

means for embedding Java bytecodes in a 3270 datastream structured field; and means for pushing the 3270 datastream structured field including Java bytecodes so embedded, from the primary logical unit to the secondary logical unit under control of the primary logical unit, without receiving a request for the Java bytecodes from the secondary logical unit.

11. A system according to claim 10 further comprising:

means for determining whether the secondary logical unit supports Java;

the pushing means being responsive to the determining means, to pass the 3270 datastream structured field including the Java bytecodes so embedded, if the secondary logical unit supports Java.

12. A system according to claim 11 wherein the primary logical unit and the secondary logical unit communicate with each other via a middle tier server, the system further comprising:

means for determining if the middle tier server supports Java;

the pushing means being responsive to the determining means, to push the 3270 datastream structured field including the Java bytecodes so embedded, if the secondary logical unit and the middle tier server both support Java.

13. A system according to claim 11 wherein the determining means comprises:

means for sending a Read Partition (Query) structured field from the primary logical unit to the secondary logical unit, to query whether the secondary logical unit supports Java; and means for sending a Query Reply structured field from the secondary logical unit to the primary logical unit in response to receipt of the Read Partition (Query) from the primary logical unit, if the secondary logical unit supports Java;

the pushing means being responsive to receipt of the Query Reply structured field from the secondary logical unit.

14. A system according to claim 10 wherein the means for embedding Java bytecodes in a 3270 datastream structured field comprises:

means for embedding a Java applet and a Java applet identifier in a 3270 datastream structured field.

15. A system according to claim 10:

wherein the means for embedding comprises means for embedding Java bytecodes of a size that exceeds a structured field length limit into a plurality of 3270 datastream structured fields; and wherein the means for pushing comprises means for spanning the plurality of 3270 datastream structured fields from the primary logical unit to the secondary logical unit.

16. A method for passing Java bytecodes between a primary logical unit and a secondary logical unit that communicate with each other over a network using 3270 datastream architecture, the method comprising the steps of:

embedding Java bytecodes in a 3270 datastream structured field; and passing the 3270 datastream structured field including the Java bytecodes so embedded, between the primary logical unit and the secondary logical unit.

17. A method according to claim 16 wherein the following step is performed before the passing step:

determining whether the secondary logical unit supports Java;

the passing step being responsive to the determining step to pass the 3270 datastream structured field including the Java bytecodes so embedded, if the secondary logical unit supports Java.

18. A method according to claim 17 wherein the primary logical unit and the secondary logical unit communicate with each other via a middle tier server, the method further comprising the step of:

determining if the middle tier server supports Java;

the passing step being responsive to the determining steps, to pass the 3270 datastream structured field including the Java bytecodes so embedded, if the secondary logical unit and the middle tier server both support Java.

19. A method according to claim 17 wherein the determining step comprises the steps of:

sending a Read Partition (Query) structured field from the primary logical unit to the secondary logical unit, to query whether the secondary logical unit supports Java; and sending a Query Reply structured field from the secondary logical unit to the primary logical unit in response to receipt of the Read Partition (Query) from the primary logical unit, if the secondary logical unit supports Java;

the passing step being responsive to receipt of the Query Reply structured field from the secondary logical unit.

20. A method according to claim 16 wherein the step of embedding Java bytecodes in a 3270 datastream structured field comprises the step of:

embedding a Java applet and a Java applet identifier in a 3270 datastream structured field.

21. A method according to claim 16:

wherein the step of embedding comprises the step of embedding Java bytecodes of a size that exceeds a structured field length limit into a plurality of 3270 datastream structured fields; and wherein the step of passing comprises the step of spanning the plurality of 3270 datastream structured fields between the primary logical unit and the secondary logical unit.

22. A method according to claim 21 wherein the spanning step is followed by the step of:

caching the plurality of 3270 datastream structured fields in the secondary logical unit to thereby reduce latency.

23. A method according to claim 22 wherein the step of spanning comprises the step of spanning the plurality of 3270 datastream structured fields including an indicator that inhibits invocation of the Java bytecodes, between the primary logical unit and the secondary logical unit.

24. A method according to claim 22 further comprising the step of:

invoking the Java bytecodes by reference;

testing whether the Java bytecodes that are invoked by reference are cached in the secondary logical unit; and requesting the Java bytecodes from the primary logical unit if the Java bytecodes that are invoked by reference are not cached in the secondary logical unit.

25. A method for passing Java bytecodes from a primary logical unit to a secondary logical unit that communicate with each other over a network using 3270 datastream architecture, the method comprising the steps of:

embedding Java bytecodes in a 3270 datastream structured field; and pushing the 3270 datastream structured field including Java bytecodes so embedded, from the primary logical unit to the secondary logical unit under control of the primary logical unit, without receiving a request for the Java bytecodes from the secondary logical unit.

26. A method according to claim 25 wherein the following step is performed before the pushing step:

determining whether the secondary logical unit supports Java;

the pushing step being responsive to the determining step to pass the 3270 datastream structured field including the Java bytecodes so embedded, if the secondary logical unit supports Java.

27. A method according to claim 26 wherein the primary logical unit and the secondary logical unit communicate with each other via a middle tier server, the method further comprising the step of:

determining if the middle tier server supports Java;

the pushing step being responsive to the determining steps, to push the 3270 datastream structured field including the Java bytecodes so embedded, if the secondary logical unit and the middle tier server both support Java.

28. A method according to claim 26 wherein the determining step comprises the steps of:

sending a Read Partition (Query) structured field from the primary logical unit to the secondary logical unit, to query whether the secondary logical unit supports Java; and sending a Query Reply structured field from the secondary logical unit to the primary logical unit in response to receipt of the Read Partition (Query) from the primary logical unit, if the secondary logical unit supports Java;

the pushing step being responsive to receipt of the Query Reply structured field from the secondary logical unit.

29. A method according to claim 25 wherein the step of embedding Java bytecodes in a 3270 datastream structured field comprises the step of:
embedding a Java applet and a Java applet identifier in a 3270 datastream structured field.

30. A method according to claim 25:
wherein the step of embedding comprises the step of embedding Java bytecodes of a size that exceeds a structured field length limit into a plurality of 3270 datastream structured fields; and
wherein the step of pushing comprises the step of spanning the plurality of 3270 datastream structured fields from the primary logical unit to the secondary logical unit.

31. A computer program product for passing Java bytecodes between a primary logical unit and a secondary logical unit that communicate with each other over a network using 3270 datastream architecture, the computer program product comprising a computer-readable storage medium having computer-readable program code means embodied in the medium, the computer-readable program code means comprising:
computer-readable program code means for embedding Java bytecodes in a 3270 datastream structured field; and
computer-readable program code means for passing the 3270 datastream structured field including the Java bytecodes so embedded, between the primary logical unit and the secondary logical unit.

32. A computer program product according to claim 31 further comprising:
computer-readable program code means for determining whether the secondary logical unit supports Java;
the passing means being responsive to the determining means, to pass the 3270 datastream structured field including the Java bytecodes so embedded, if the secondary logical unit supports Java.

33. A computer program product according to claim 32 wherein the primary logical unit and the secondary logical unit communicate with each other via a middle tier server, the computer program product further comprising:
computer-readable program code means for determining if the middle tier server supports Java;
the passing means being responsive to the determining means, to pass the 3270 datastream structured field including the Java bytecodes so embedded, if the secondary logical unit and the middle tier server both support Java.

34. A computer program product according to claim 32 wherein the determining means comprises:
computer-readable program code means for sending a Read Partition (Query) structured field from the primary logical unit to the secondary logical unit, to query whether the secondary logical unit supports Java; and
computer-readable program code means for sending a Query Reply structured field from the secondary logical unit to the primary logical unit in response to receipt of the Read Partition (Query) from the primary logical unit, if the secondary logical unit supports Java;
the passing means being responsive to receipt of the Query Reply structured field from the secondary logical unit.

35. A computer program product according to claim 31 wherein the means for embedding Java bytecodes in a 3270 datastream structured field comprises:
computer-readable program code means for embedding a Java applet and a Java applet identifier in a 3270 datastream structured field.

36. A computer program product according to claim 31:
wherein the means for embedding comprises computer-readable program code means for embedding Java bytecodes of a size that exceeds a structured field length limit into a plurality of 3270 datastream structured fields; and
wherein the means for passing comprises computer-readable program code means for spanning the plurality of 3270 datastream structured fields between the primary logical unit and the secondary logical unit.

37. A computer program product according to claim 36 further comprising:
computer-readable program code means for caching the plurality of 3270 datastream structured fields in the secondary logical unit to thereby reduce latency.

38. A computer program product according to claim 37 wherein the means for spanning comprises means for spanning the plurality of 3270 datastream structured fields including an indicator that inhibits invocation of the Java bytecodes, between the primary logical unit and the secondary logical unit.

39. A computer program product according to claim 37 further comprising:
computer-readable program code means for invoking the Java bytecodes by reference;
computer-readable program code means for testing whether the Java bytecodes that are invoked by reference are cached in the secondary logical unit; and
computer-readable program code means for requesting the Java bytecodes from the primary logical unit if the Java bytecodes that are invoked by reference are not cached in the secondary logical unit.

40. A computer program product for passing Java bytecodes from a primary logical unit to a secondary logical unit that communicate with each other over a network using 3270 datastream architecture, the computer program product comprising a computer-readable storage medium having computer-readable program code means embodied in the medium, the computer-readable program code means comprising:
computer-readable program code means for embedding Java bytecodes in a 3270 datastream structured field; and
computer-readable program code means for pushing the 3270 datastream structured field including Java bytecodes so embedded, from the primary logical unit to the secondary logical unit under control of the primary logical unit, without receiving a request for the Java bytecodes from the secondary logical unit.

41. A computer program product according to claim 40 further comprising:
computer-readable program code means for determining whether the secondary logical unit supports Java;
the pushing means being responsive to the determining means, to pass the 3270 datastream structured field including the Java bytecodes so embedded, if the secondary logical unit supports Java.

42. A computer program product according to claim 41 wherein the primary logical unit and the secondary logical unit communicate with each other via a middle tier server, the system further comprising:
computer-readable program code means for determining if the middle tier server supports Java;

the pushing means being responsive to the determining means, to push the 3270 datastream structured field including the Java bytecodes so embedded, if the secondary logical unit and the middle tier server both support Java.

43. A computer program product according to claim 41 wherein the determining means comprises:

computer-readable program code means for sending a Read Partition (Query) structured field from the primary logical unit to the secondary logical unit, to query whether the secondary logical unit supports Java; and computer-readable program code means for sending a Query Reply structured field from the secondary logical unit to the primary logical unit in response to receipt of the Read Partition (Query) from the primary logical unit, if the secondary logical unit supports Java;

the pushing means being responsive to receipt of the Query Reply structured field from the secondary logical unit.

44. A computer program product according to claim 40 wherein the means for embedding Java bytecodes in a 3270 datastream structured field comprises:

computer-readable program code means for embedding a Java applet and a Java applet identifier in a 3270 datastream structured field.

45. A computer program product according to claim 40:

wherein the means for embedding comprises computer-readable program code means for embedding Java bytecodes of a size that exceeds a structured field length limit into a plurality of 3270 datastream structured fields; and wherein the means for pushing comprises computer-readable program code means for spanning the plurality of 3270 datastream structured fields from the primary logical unit to the secondary logical unit.

46. A system for passing objects between a primary logical unit and a secondary logical unit that communicate with each other over a network using 3270 datastream architecture, the system comprising:

means for embedding the objects in a 3270 datastream structured field; and means for passing the 3270 datastream structured field including the objects so embedded, between the primary logical unit and the secondary logical unit.

47. A system according to claim 46 further comprising:

means for determining whether the secondary logical unit supports the objects;

the passing means being responsive to the determining means, to pass the 3270 datastream structured field including the objects so embedded, if the secondary logical unit supports the objects.

48. A system according to claim 47 wherein the primary logical unit and the secondary logical unit communicate with each other via a middle tier server, the system further comprising:

means for determining if the middle tier server supports the objects;

the passing means being responsive to the determining means, to pass the 3270 datastream structured field including the objects so embedded, if the secondary logical unit and the middle tier server both support the objects.

49. A system according to claim 46 wherein the determining means comprises:

means for sending a Read Partition (Query) structured field from the primary logical unit to the secondary logical unit, to query whether the secondary logical unit supports the objects; and means for sending a Query Reply structured field from the secondary logical unit to the primary logical unit in response to receipt of the Read Partition (Query) from the primary logical unit, if the secondary logical unit supports the objects;

the passing means being responsive to receipt of the Query Reply structured field from the secondary logical unit.

50. A system according to claim 46 wherein the means for embedding objects in a 3270 datastream structured field comprises at least one of:

means for embedding a Java applet and a Java applet identifier in a 3270 datastream structured field;

means for embedding an image and an image identifier in a 3270 datastream structured field; and means for embedding audio and an audio identifier in a 3270 datastream structured field.

51. A system according to claim 46:

wherein the means for embedding comprises means for embedding an object of a size that exceeds a structured field length limit into a plurality of 3270 datastream structured fields; and wherein the means for passing comprises means for spanning the plurality of 3270 datastream structured fields between the primary logical unit and the secondary logical unit.

52. A system according to claim 51 further comprising:

means for caching the plurality of 3270 datastream structured fields in the secondary logical unit to thereby reduce latency.

53. A system according to claim 51 wherein the means for spanning comprises means for spanning the plurality of 3270 datastream structured fields including an indicator that inhibits invocation of the objects, between the primary logical unit and the secondary logical unit.

54. A system according to claim 53 further comprising:

means for invoking the object by reference;

means for testing whether the object that is invoked by reference is cached in the secondary logical unit; and means for requesting the object from the primary logical unit if the object that is invoked by reference is not cached in the secondary logical unit.

55. A method for passing objects between a primary logical unit and a secondary logical unit that communicate with each other over a network using 3270 datastream architecture, the method comprising the steps of:

embedding an object in a 3270 datastream structured field; and passing the 3270 datastream structured field including the object so embedded, between the primary logical unit and the secondary logical unit.

56. A method according to claim 55 wherein the following step is performed before the passing step:

determining whether the secondary logical unit supports the object;

the passing step being responsive to the determining step to pass the 3270 datastream structured field including the object so embedded, if the secondary logical unit supports the object.

57. A method according to claim 56 wherein the primary logical unit and the secondary logical unit communicate with each other via a middle tier server, the method further comprising the step of:

determining if the middle tier server supports the object;

the passing step being responsive to the determining steps, to pass the 3270 datastream structured field including the object so embedded, if the secondary logical unit and the middle tier server both support the object.

58. A method according to claim 56 wherein the determining step comprises the steps of:

sending a Read Partition (Query) structured field from the primary logical unit to the secondary logical unit, to query whether the secondary logical unit supports the object; and sending a Query Reply structured field from the secondary logical unit to the primary logical unit in response to receipt of the Read Partition (Query) from the primary logical unit, if the secondary logical unit supports the object;

the passing step being responsive to receipt of the Query Reply structured field from the secondary logical unit.

59. A method according to claim 55 wherein the step of embedding an object in a 3270 datastream structured field comprises at least one of the steps of:

embedding a Java applet and a Java applet identifier in a 3270 datastream structured field;

embedding an image and an image identifier in a 3270 datastream structured field; and embedding audio and an audio identifier in a 3270 datastream structured field.

60. A method according to claim 55:

wherein the step of embedding comprises the step of embedding an object of a size that exceeds a structured field length limit into a plurality of 3270 datastream structured fields; and wherein the step of passing comprises the step of spanning the plurality of 3270 datastream structured fields between the primary logical unit and the secondary logical unit.

61. A method according to claim 60 wherein the spanning step is followed by the step of:

caching the plurality of 3270 datastream structured fields in the secondary logical unit to thereby reduce latency.

62. A method according to claim 61 wherein the step of spanning comprises the step of spanning the plurality of 3270 datastream structured fields including an indicator that inhibits invocation of the object, between the primary logical unit and the secondary logical unit.

63. A method according to claim 61 further comprising the steps of:

invoking the object by reference;

testing whether the object that is invoked by reference is cached in the secondary logical unit; and requesting the object from the primary logical unit if the object that is invoked by reference is not cached in the secondary logical unit.

64. A computer program product for passing objects between a primary logical unit and a secondary logical unit that communicate with each other over a network using 3270 datastream architecture, the computer program product comprising a computer-readable storage medium having computer-readable program code means embodied in the medium, the computer-readable program code means comprising:

computer-readable program code means for embedding an object in a 3270 datastream structured field; and computer-readable program code means for passing the 3270 datastream structured field including the object so embedded, between the primary logical unit and the secondary logical unit.

65. A computer program product according to claim 64 further comprising:

computer-readable program code means for determining whether the secondary logical unit supports the object;

the passing means being responsive to the determining means, to pass the 3270 datastream structured field including the object so embedded, if the secondary logical unit supports the object.

66. A computer program product according to claim 65 wherein the primary logical unit and the secondary logical unit communicate with each other via a middle tier server, the computer program product further comprising:

computer-readable program code means for determining if the middle tier server supports the object;

the passing means being responsive to the determining means, to pass the 3270 datastream structured field including the object so embedded, if the secondary logical unit and the middle tier server both support the object.

67. A computer program product according to claim 65 wherein the determining means comprises:

computer-readable program code means for sending a Read Partition (Query) structured field from the primary logical unit to the secondary logical unit, to query whether the secondary logical unit supports the object; and computer-readable program code means for sending a Query Reply structured field from the secondary logical unit to the primary logical unit in response to receipt of the Read Partition (Query) from the primary logical unit, if the secondary logical unit supports the object;

the passing means being responsive to receipt of the Query Reply structured field from the secondary logical unit.

68. A computer program product according to claim 64 wherein the means for embedding an object in a 3270 datastream structured field comprises at least one of:

computer-readable program code means for embedding a Java applet and a Java applet identifier in a 3270 datastream structured field;

computer-readable program code means for embedding an image and an image identifier in a 3270 datastream structured field; and computer-readable program code means for embedding audio and an audio identifier in a 3270 datastream structured field.

69. A computer program product according to claim 64:

wherein the means for embedding comprises computer-readable program code means for embedding an object of a size that exceeds a structured field length limit into a plurality of 3270 datastream structured fields; and wherein the means for passing comprises computer-readable program code means for spanning the plurality of 3270 datastream structured fields between the primary logical unit and the secondary logical unit.

70. A computer program product according to claim 69 further comprising:

computer-readable program code means for caching the plurality of 3270 datastream structured fields in the secondary logical unit to thereby reduce latency.

71. A computer program product according to claim 70 wherein the means for spanning comprises means for spanning the plurality of 3270 datastream structured fields including an indicator that inhibits invocation of the object, between the primary logical unit and the secondary logical unit.

72. A computer program product according to claim 70 further comprising:

computer-readable program code means for invoking the object by reference;

computer-readable program code means for testing whether the object that is invoked by reference is cached in the secondary logical unit; and computer-readable program code means for requesting the object from the primary logical unit if the object that is invoked by reference is not cached in the secondary logical unit.

* * * * *